(12) United States Patent
Luke

(10) Patent No.: US 10,948,261 B2
(45) Date of Patent: Mar. 16, 2021

(54) METHOD AND APPARATUS FOR VARYING PROJECTILE VELOCITY

(71) Applicant: PROJECT 47, LLC, Middleton, ID (US)

(72) Inventor: Jeffrey H. Luke, Middleton, ID (US)

(73) Assignee: PROJECT 47, LLC, Middleton, ID (US)

( * ) Notice: Subject to any disclaimer, the term of this patent is extended or adjusted under 35 U.S.C. 154(b) by 0 days.

(21) Appl. No.: 16/366,587

(22) Filed: Mar. 27, 2019

(65) Prior Publication Data

US 2019/0316872 A1    Oct. 17, 2019

Related U.S. Application Data

(60) Provisional application No. 62/648,437, filed on Mar. 27, 2018.

(51) Int. Cl.
*F41B 11/723* (2013.01)
*F16K 1/52* (2006.01)

(52) U.S. Cl.
CPC ............ *F41B 11/723* (2013.01); *F16K 1/523* (2013.01)

(58) Field of Classification Search
CPC ........... F41B 11/723; F16K 1/52; F16K 1/523
USPC .............................................. 124/73; 251/356
See application file for complete search history.

(56) References Cited

U.S. PATENT DOCUMENTS

| 1,516,483 | A | * | 11/1924 | Krafft | F41A 9/23 124/69 |
| 1,640,408 | A | * | 8/1927 | House | F04B 53/102 137/329.04 |
| 2,708,095 | A | * | 5/1955 | Mitchell | B05B 7/1209 251/229 |
| 2,998,810 | A | * | 9/1961 | Anastasia | F42C 21/00 124/75 |
| 3,739,764 | A | * | 6/1973 | Allport | A63H 27/14 124/70 |
| 6,000,386 | A | * | 12/1999 | Johnson | F41B 9/0018 124/69 |
| 7,913,679 | B2 | * | 3/2011 | Quinn | F41B 11/722 124/77 |
| 2003/0106545 | A1 | * | 6/2003 | Verini | F41B 11/724 124/74 |
| 2009/0229591 | A1 | * | 9/2009 | Gabrel | F41B 11/62 124/73 |
| 2019/0162328 | A1 | * | 5/2019 | Gilbert | F16K 31/365 |
| 2019/0249946 | A1 | * | 8/2019 | DiBlasio | F41B 11/723 |
| 2020/0132412 | A1 | * | 4/2020 | Pedicini | F41B 11/64 |

* cited by examiner

*Primary Examiner* — Samir Abdosh
(74) *Attorney, Agent, or Firm* — Parsons Behle & Latimer

(57) ABSTRACT

Systems and methods are disclosed for a fluid-based projectile launcher having a housing, that may also include a barrel portion, and a propellant fluid chamber. Disclosed embodiments also include a valve assembly that controls flow of propellant fluid from the propellant fluid chamber to the barrel portion through a fluid passageway, and an adjustable block assembly that controls motion and/or position of the valve assembly.

17 Claims, 15 Drawing Sheets

METHOD AND APPARATUS FOR VARYING PROJECTILE VELOCITY

CROSS-REFERENCE TO RELATED APPLICATIONS

This application, under 35 U.S.C. § 119, claims the benefit of U.S. Provisional Patent Application Ser. No. 62/648,437 filed on Mar. 27, 2018, and entitled "Method And Apparatus For Varying Projectile Velocity," the contents of which are hereby incorporated by reference herein.

FIELD OF THE DISCLOSURE

This disclosure relates generally to fluid-based projectile launchers. In particular, this disclosure relates to systems and methods for providing variable speed and variable force fluid-based projectile launchers.

BACKGROUND

Typical fluid-based projectile launching systems utilize a propellant fluid. In these devices, the propellant fluid is typically held in some storage system. The propellant may also be introduced to the device through some interface. The fluid has some amount of stored energy based on factors such as pressure and volume. One example of a storage system is a container holding a given volume of fluid at a given pressure. The propellant may also have energy added to it via pumps, fans, compressors, and so forth, or it may provide energy through chemical reactions (e.g., combustion) and so forth.

At the time of launching the projectile, the propellant is released in such a manner that it applies a force on the projectile, either directly or indirectly, causing it to move. The speed at which the projectile is released is dependent on the energy of the propellant.

With such devices, there may be a desire to propel projectiles at different speeds using the same launching device. Or there may be a desire to launch different projectiles with different mass and/or aerodynamic attributes at the same speed, or to allow for launching different projectiles with different characteristics at appropriate velocities.

Typically, the velocity is varied by changing the amount of stored propellant or the pressure of the stored propellant, reducing or increasing the stored energy in order to reduce or increase the speed of the projectile, or adjusting the energy rate (such as changing the speed of a pump which provides energy to the fluid). Adding or removing propellant or increasing or reducing the pressure of the propellant presents challenges, inconveniences, and limitations such as time involved, monitoring and regulating pressure levels, safe mechanism to reduce pressure, noise, and so forth.

Other drawbacks, inconveniences, and issues with current systems and methods also exist.

SUMMARY

Accordingly, presently disclosed systems and methods address the above, and other, drawbacks, inconveniences, and issues with current systems and methods. Disclosed methods and apparatus allow the speed of a projectile propelled (or 'launched') via fluid to vary without requiring a change to the energy of the propellant fluid.

Disclosed methods and apparatus also allow for the projectile speed to be selected rapidly, without necessitating any changes to the propellant amount, pressure or energy. Disclosed methods and apparatus also allow for propelling projectiles with different mass at the same speed with the same stored energy.

As noted above, herein disclosed embodiments relate to projectile launching systems, utilizing fluid (e.g., air, water, or the like) to propel or launch a projectile. The fluid may be in a pressure vessel or connected to a fluid supply source. The fluid is released or introduced in some manner such that it imparts or applies a force, either directly or indirectly on the projectile, causing it to move.

Disclosed systems and methods provide varying initial launch speeds. The variation of launch speeds does not require adjustment to the propellent fluid source. The adjustment may also be made in conjunction with changes to the propellent fluid source, such as to compensate for changes in pressure, or to allow for a larger overall range of speeds.

As disclosed, a passageway is constructed through which the fluid flows. The fluid provides a force, either directly or indirectly, on the projectile. A variety of valves are disclosed which, when adjusted, change the cross-sectional area of the passageway. For example, the cross-sectional area of the passageway may be changed by a translating or rotating gate which has variable positions, the different positions creating different cross-sectional areas relative to the fluid flow.

As also disclosed, a blocking plug, or the like, may be part of the system which controls the position(s) of the various passageway valves via direct contact, or through another member or series of members, which contacts directly or indirectly a member which limits the movement (and therefore the position) of the valve. The limiting mechanism is not necessarily a mechanical contact, but could be fluidic pressure, or electromagnetic force.

In another embodiment the fluid passageway may contain a section wherein there is a valve with a shape such that the cross-sectional area of the fluid path changes as the valve moves relative to the fluid path. For example, a tapered shape, a tapered passageway, or a tapered shape and tapered passageway, or non-tapered shapes with different geometries which result in different cross-sectional areas for fluid flow in the fluid passageway. An adjustable plug member may also be part of the system which controls the position of the valve and which contacts directly or indirectly the valve and limits the movement (and therefore the position) of the shape, thereby changing the cross-sectional area of the fluid passageway. The adjustment mechanism need not necessarily be mechanical contact, but could be fluidic pressure, or electromagnetic force.

Disclosed embodiments include a valve assembly for a fluid-based projectile launcher including a housing having a propellant fluid chamber, a valve assembly that selectively meters the flow of propellant fluid from the propellant fluid chamber to a fluid passageway, and an adjustable block assembly that controls motion of the valve assembly.

Further disclosed embodiments include a valve assembly having a valve head proximal to a valve stem which is proximal to a valve stopper and wherein the valve stopper substantially seals the fluid passageway in a closed position.

Further disclosed embodiments include a fluid passageway that is tapered and the valve stopper is substantially not tapered.

Further disclosed embodiment include a barrel that attaches to the housing.

Further disclosed embodiments include an adjustable block assembly having an adjustable position plug that contacts at least a portion of the valve assembly to prevent further motion of the valve assembly. In still further embodiments, the adjustable position plug has threading. In still further disclosed embodiments, the adjustable block assembly has a stop that contacts the adjustable position plug to prevent further motion of the valve assembly.

In further disclosed embodiments, the valve assembly has a valve hatch that substantially seals the fluid passageway in a closed position. In still further disclosed embodiments, the valve hatch pivots to change the cross-sectional area of the fluid passageway. In still further disclosed embodiments, the valve hatch pivots about a central pivot to change the cross-sectional area of the fluid passageway. In still further embodiments, the valve hatch moves in a substantially linear direction to change the cross-sectional area of the fluid passageway.

In further disclosed embodiments, propellant fluid is stored in the propellant fluid chamber prior to release into the fluid passageway. In still further disclosed embodiments, propellant fluid is introduced into the propellant fluid chamber from another source prior to release into the fluid passageway.

Also disclosed are methods of making a valve assembly for a fluid-based projectile launcher, the method including providing a housing comprising a propellant fluid chamber, providing a valve assembly that selectively meters the flow of propellant fluid from the propellant fluid chamber through a fluid passageway, and providing an adjustable block assembly that controls motion of the valve assembly.

Further disclosed embodiments include providing a valve head proximal to a valve stem which is proximal to a valve stopper and wherein the valve stopper substantially seals the fluid passageway in a closed position.

Further disclosed embodiments include providing a valve hatch and wherein the valve hatch substantially seals the fluid passageway in a closed position.

Further disclosed embodiments include the step of providing an adjustable block assembly by providing an adjustable position plug that contacts at least a portion of the valve assembly to prevent further motion of the valve assembly.

Further disclosed embodiments include a valve assembly for projectile launcher system having a housing having a propellant fluid chamber, a valve assembly that selectively changes a cross-sectional area of a fluid passageway to change the flow of propellant fluid from the propellant fluid chamber through the fluid passageway, and an adjustable block assembly that controls the position of the valve assembly.

Further disclosed embodiments include a valve head adjacent to a valve stem which is adjacent to a valve stopper and wherein the valve stopper substantially seals the fluid passageway in a closed position. In still further disclosed embodiments, the valve assembly further includes a valve hatch and wherein the valve hatch substantially seals the fluid passageway in a closed position. Other advantages, conveniences, and features of disclosed embodiments also exist.

Figure 1:
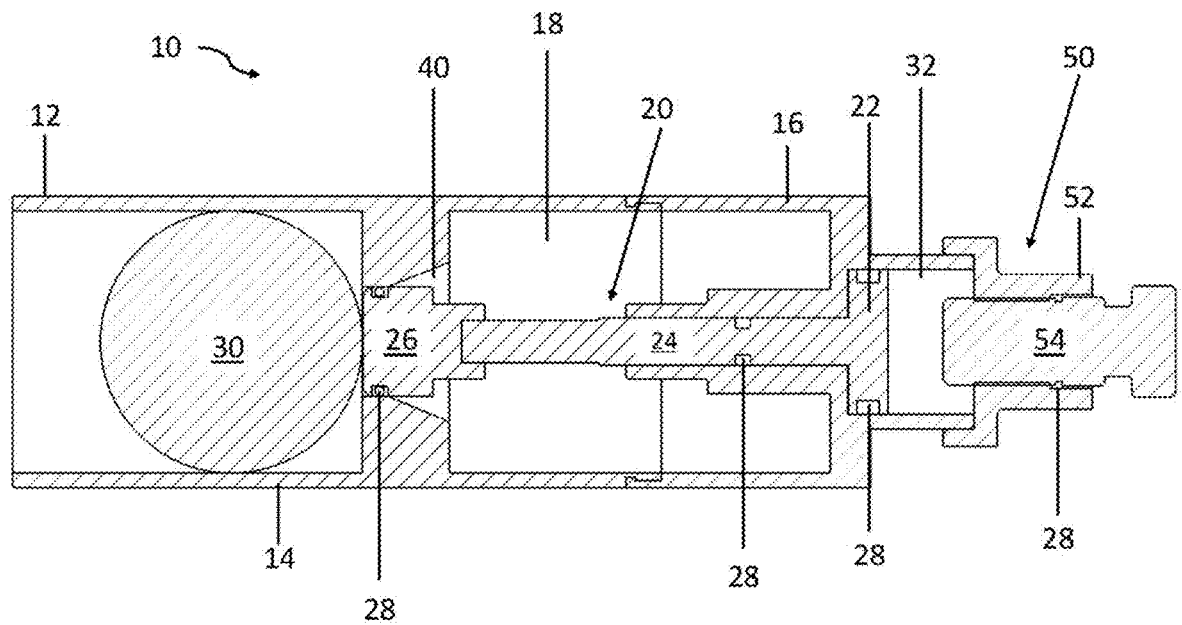
FIG. 1 is a cross-sectional view of a fluid-based projectile launcher with a valve assembly in a closed position in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 is a cross-sectional view of a fluid-based projectile launcher 10 with a valve assembly 20 in a closed position in accordance with disclosed embodiments. As shown, embodiments of the projectile launcher 10 may include a housing 12 which may be made of any suitable material for the intended use, propellant, fluid pressure, projectile type, and the like. For example, the housing 12 may be made of metals, plastics, composite materials, natural materials, fiberglass, glass, rubber, or the like. As also indicated in FIG. 1, housing 12 may include a barrel portion 14 and a valve cap portion 16 which may be separate pieces that are threaded, snap-fit together, or otherwise fastened together. Other embodiments of the launcher 10 may have a unitary housing 12, or may have a multiple piece (e.g., more than two) housing 12.

As also shown, embodiments of the launcher 10 may include a propellant fluid chamber 18 within housing 12. As disclosed herein, one purpose of the propellant fluid is to act as a propellant to launch the projectile 30. In some embodiments, fluid chamber 18 and the fluid within may be pressurized. In some embodiments, propellant fluid may not necessarily be stored in a closed fluid chamber 18 and the fluid may be supplied continually from a holding tank, pump, fan, or other source of providing fluid at sufficient energy to move the projectile 30. For example, there may be fluid provided into chamber 18 through a port or other opening or coupling (not shown in FIG. 1).

Embodiments of valve assembly 20 may include a valve head 22, a valve stem 24, and a valve stopper 26. As one of ordinary skill in the art having the benefit of this disclosure would understand, other valve assemblies 20 may also be implemented. As also indicated, any number and type of seals 28 (e.g., O-rings, gaskets, valve seats, washers, or the like) may be used to appropriately seal valve assembly 20, as well as other portions of launcher 10. Valve assembly 20 may be a unitary assembly (as shown in FIG. 1), may be a multi-piece assembly (e.g., valve head 22 is a separate piece from valve stem 24, etc.)

As also shown, valve assembly 20 is used to control flow of propellant fluid from fluid chamber 18 through fluid passageway 40 to barrel portion 14 and its ultimate impact upon projectile 30. As shown in FIG. 1, valve assembly 20 is closed with valve stopper 26 blocking fluid passageway 40.

Embodiments of launcher 10 also include an adjustable block assembly 50 that controls the position of valve assembly 20 as described herein. For the embodiment shown in FIG. 1, the adjustable block assembly 50 may include a cap or other retaining portion 52 that enables the selectable positioning of a plug 54 that contacts valve head 22 to control the extent of travel of the valve stem 24 and valve stopper 26. Retaining portion 52 may thread onto, or otherwise be attached (e.g., welding, adhesive, or the like) to the valve cap portion 16 of housing 12. As one of ordinary skill in the art would understand having the benefit of this disclosure, other adjustable block assemblies 50, other contact points on the valve assembly 20 including, but not limited to, additional components that in turn contact valve assembly 20, or the like may also be implemented.

In one mode of operation, propellant is contained in fluid chamber 18, or propellent may be otherwise introduced into fluid passageway 40 which is fluidly-isolated from the projectile 30 until launched. Opening the valve assembly 20 releases the propellant fluid, causing the projectile 30 to move. The valve is opened via a trigger or other mechanism (not shown in FIG. 1) that causes valve head 22 (and valve stem 24 and valve stopper 26) to move. For example, in the embodiments of FIGS. 1-3, a trigger may be fluid powered piston, meaning that fluid (which may or may not be the propellant fluid) is introduced into chamber 32 above and/or below the valve head 22 causing it to move. However, in other embodiments, the valve assembly may be controlled by a spring and latch, a combination of a spring and fluid power, a drive screw, electric motor or the like.

Figure 2:
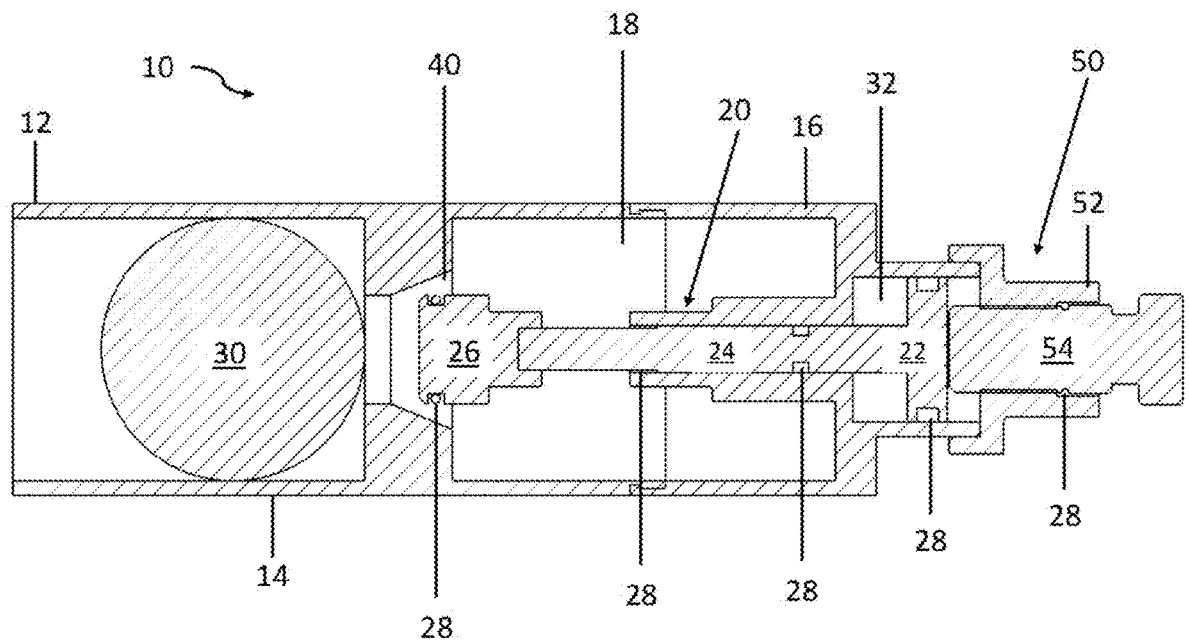
FIG. 2 is a cross-sectional view of a fluid-based projectile launcher with a valve assembly in a partially open position in accordance with disclosed embodiments.
Figure 3:
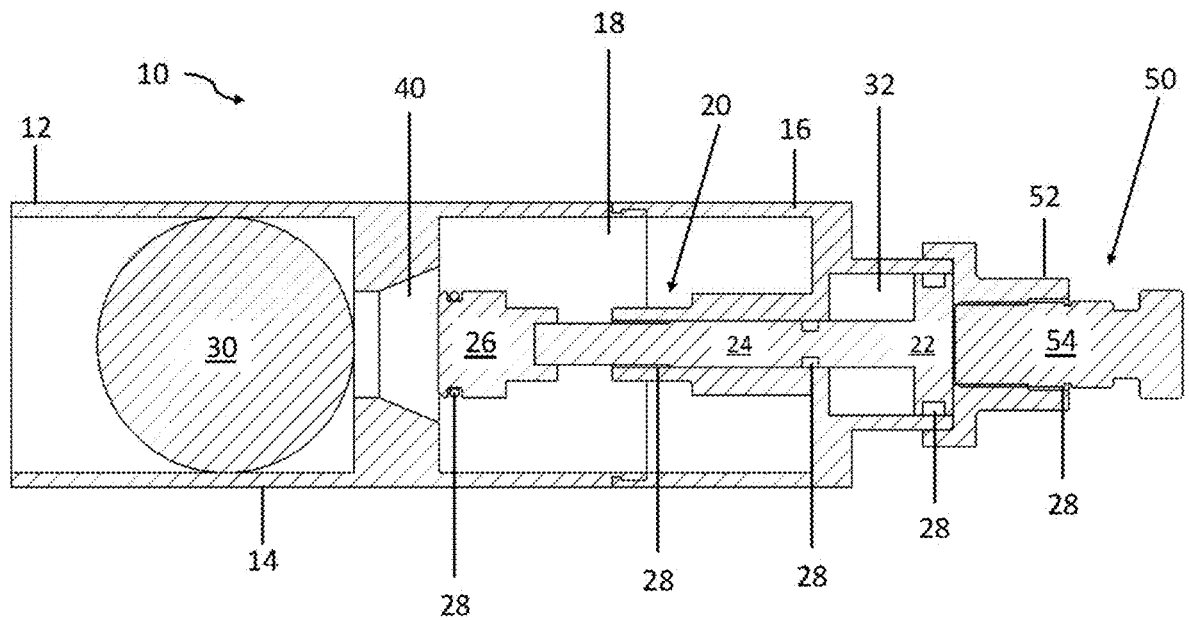
FIG. 3 is a cross-sectional view of a fluid-based projectile launcher with a valve assembly in an open position in accordance with disclosed embodiments.

FIG. 2 is a cross-sectional view of a fluid-based projectile launcher 10 with a valve assembly 20 in a partially open position in accordance with disclosed embodiments. As shown, the adjustable block assembly 50 is preventing the valve head 22 to open as far as is shown in FIG. 3 as discussed below. In this restricted, or less-than-full, state of travel, the valve stopper 26 creates a smaller cross-sectional area for at least a portion of the fluid passageway 40. This results in the projectile 30 being launched at a different speed than in a more open state shown in FIG. 3. As one of ordinary skill in the art having the benefit of this disclosure would understand, by adjusting the position of adjustable block assembly 50 prior to opening the valve assembly 20, the projectile 30 may be launched at higher or lower initial speeds.

FIG. 3 is a cross-sectional view of a fluid-based projectile launcher 10 with a valve assembly 20 in an open position in accordance with disclosed embodiments. FIG. 3 shows the same cross section view of the projectile launcher 10 as FIGS. 1-2, with the launcher 10 having the valve assembly 20 in a fully open position. The item numbers/references shown in the figures are the same for like components.

When the valve assembly 20 is in an open position, the fluid will travel through the fluid passageway 40 and the force of the fluid will cause the projectile 30 to move. Note that in FIG. 3 the adjustable block assembly 50 is in a fully retracted position, which allows the valve stopper 26 to stop in the a fully open position. In this configuration, the projectile 30 will be launched at the maximum speed.

Figure 4:
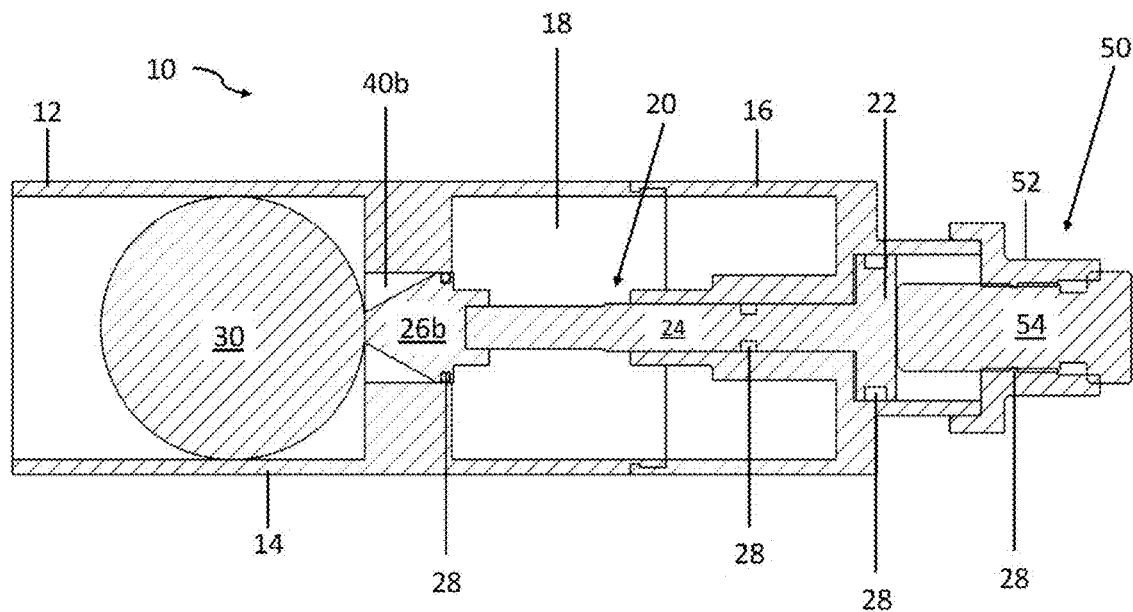
FIG. 4 is a cross-sectional view of a fluid-based projectile launcher with a valve assembly in a closed position in accordance with disclosed embodiments.

FIG. 4 is a cross-sectional view of a fluid-based projectile launcher 10 with a valve assembly 20 in a closed position in accordance with disclosed embodiments. FIG. 4 shows a cross-section of a projectile launcher 10 in the valve assembly 20 fully closed state.

Again, propellant fluid chamber 18 contains a fluid one purpose of which is to act as a propellant to launch the projectile 30. Propellant fluid may not necessarily be stored in a closed chamber 18. As discussed above in context of FIGS. 1-3, the fluid source may be from a holding tank, pump, fan, or other method of providing fluid at sufficient energy to move the projectile 30.

As shown by way of example in FIG. 4, fluid passageway 40*b* may have any number of suitable shapes and opening sizes. Accordingly, valve stopper 26*b* may be correspondingly shaped to selectively seal and open the passageway 40*b*.

Figure 5:
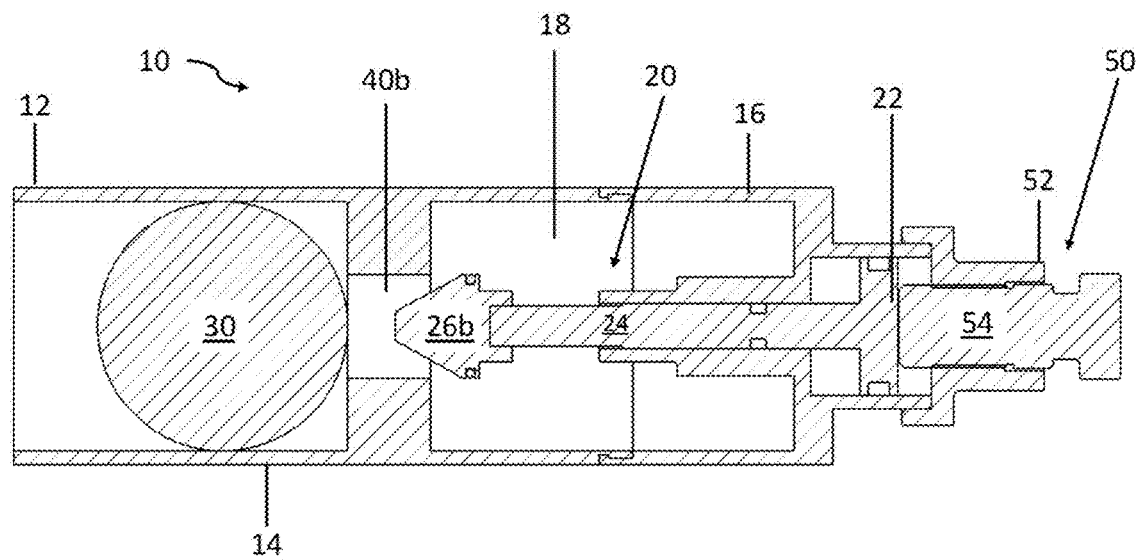
FIG. 5 is a cross-sectional view of a fluid-based projectile launcher with a valve assembly in a partially open position in accordance with disclosed embodiments.

FIG. 5 is a cross-sectional view of a fluid-based projectile launcher 10 with a valve assembly 20 in a partially open position in accordance with disclosed embodiments. FIG. 5 is the same view with the same components as FIG. 4, but FIG. 5 shows the projectile launcher 10 with the valve assembly 20 in an open state, but in an open state where the cross-sectional area of the fluid passageway 40*b* is reduced, relative to another state.

Figure 6:
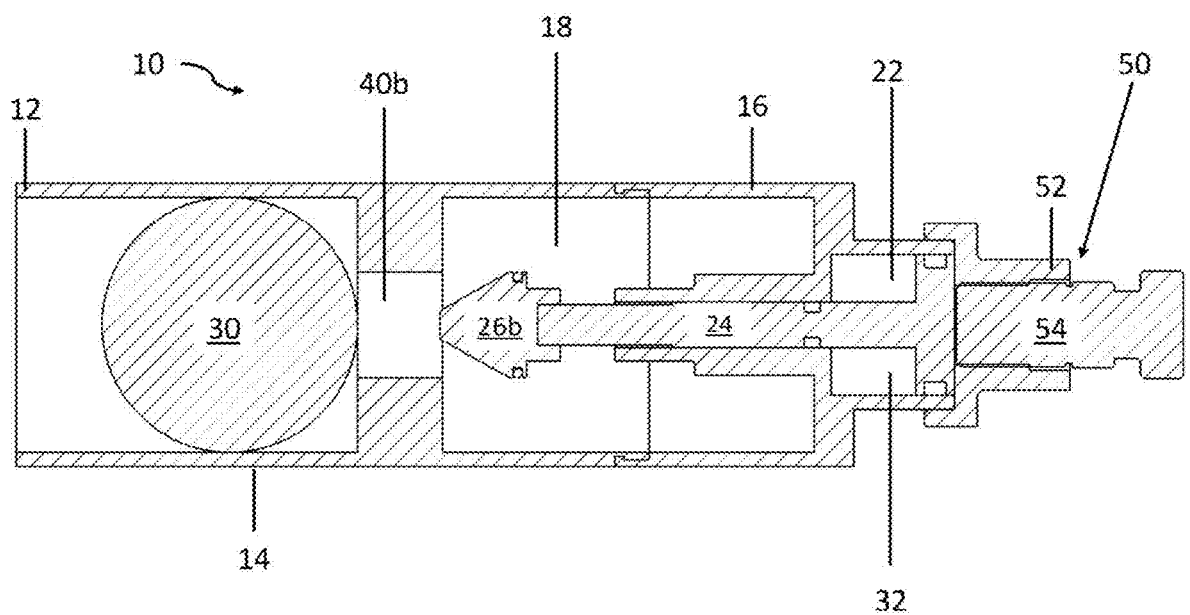
FIG. 6 is a cross-sectional view of a fluid-based projectile launcher with a valve assembly in an open position in accordance with disclosed embodiments.

FIG. 6 is a cross-sectional view of a fluid-based projectile launcher 10 with a valve assembly 20 in another open position in accordance with disclosed embodiments. FIG. 6 is the same view with the same components as FIGS. 4-5, but FIG. 6 shows the projectile launcher 10 with valve assembly 20 in a fully open state, where the cross-sectional area of the fluid passageway 40*b* is increased, relative to that shown in FIG. 5.

Figure 7:
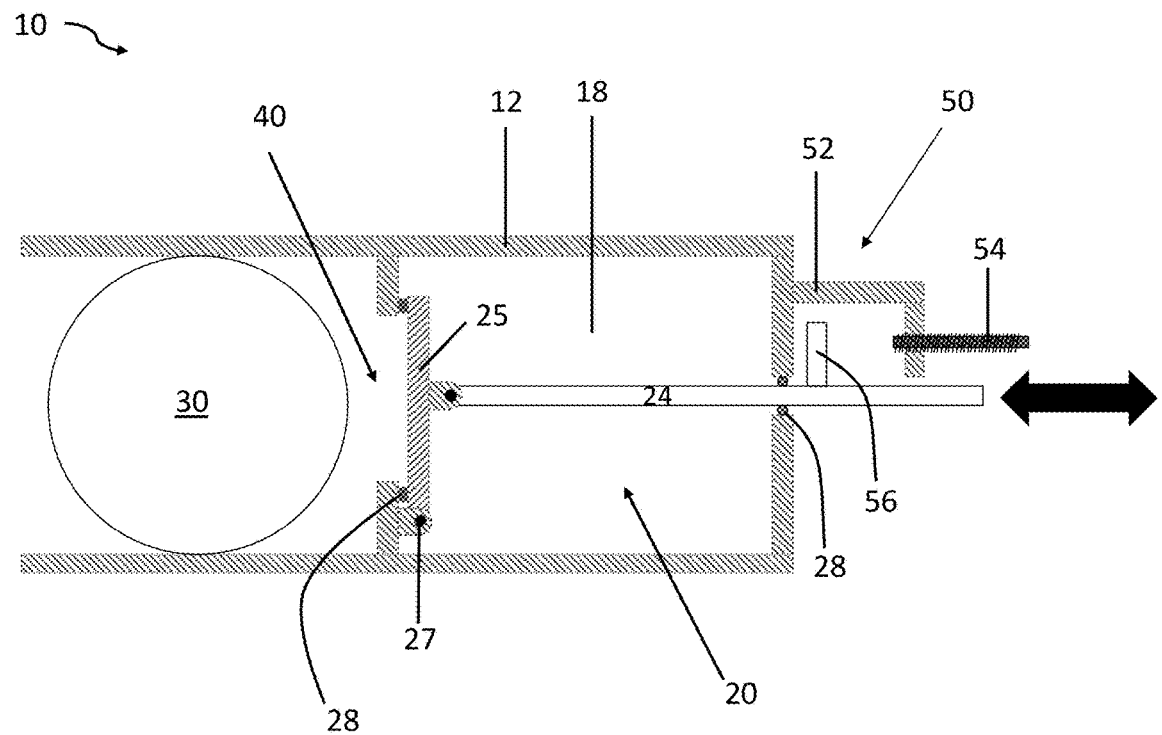
FIG. 7 is a schematic cross-sectional view of a fluid-based projectile launcher with a valve assembly in a closed position in accordance with disclosed embodiments.

FIG. 7 is a schematic cross-sectional view of a fluid-based projectile launcher 10 with a valve assembly 20 in a closed position in accordance with disclosed embodiments. FIG. 7 shows a schematic cross section of a projectile launcher 10 with another embodiment of a valve assembly 20 in the closed state. As shown, embodiments of valve assembly 20 may include a door or hatch 25 that is pivotally connected to valve stem 24 and opens and closes by pivoting about pivot 27. While a single pivot 27 is schematically shown in FIG. 7, other configurations, numbers of pivots, hinges, or the like, may also be used. As also shown in FIG. 7, another embodiment of adjustable block assembly 50 may be used. As shown, adjustable block assembly 50 may comprise a stop 56 connected to valve stem 24, or other intermediate component, and plug 54 may be threaded to enable fine tuning of the amount valve assembly 20 will travel.

Figure 8:
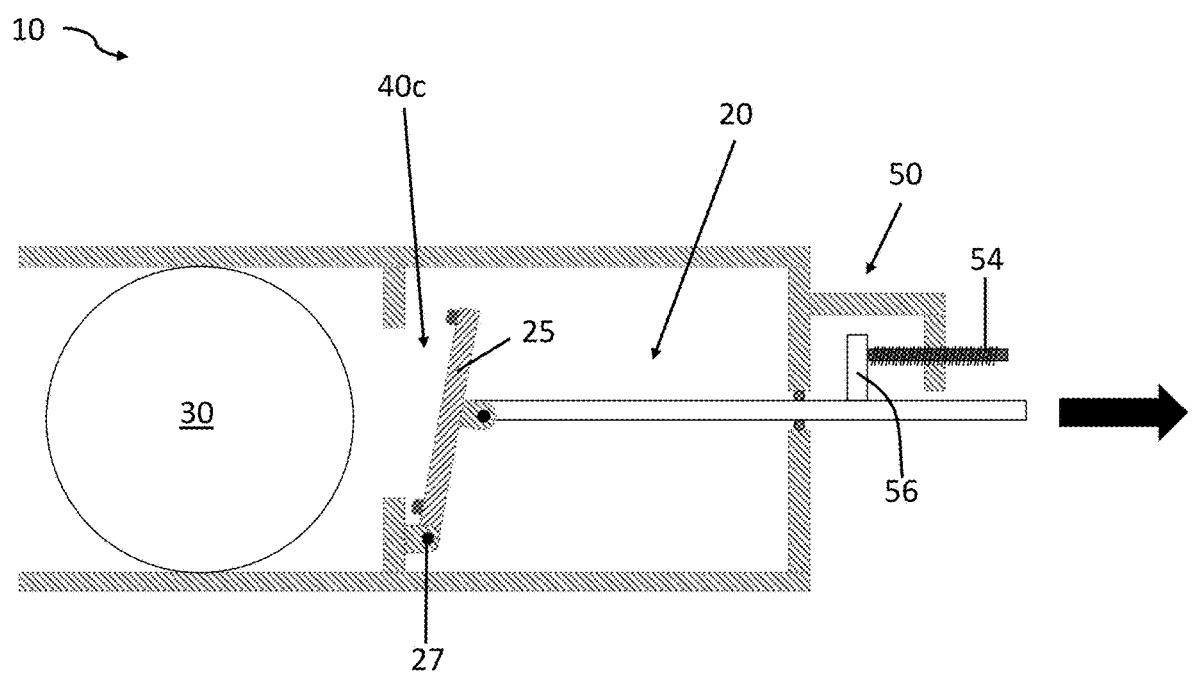
FIG. 8 is a schematic cross-sectional view of a fluid-based projectile launcher with a valve assembly in an open position with a reduced area fluid passageway in accordance with disclosed embodiments.

FIG. 8 is a schematic cross-sectional view of a fluid-based projectile launcher 10 with a valve assembly 20 in an open position with a reduced area fluid passageway 40*c* in accordance with disclosed embodiments. FIG. 8 is the same view with the same components as FIG. 7, but FIG. 8 shows the projectile launcher 10 with the valve assembly 20 in an open state, but in an open state where the cross-sectional area of the fluid passageway 40*c* is reduced, relative to a fully open state.

Figure 9:
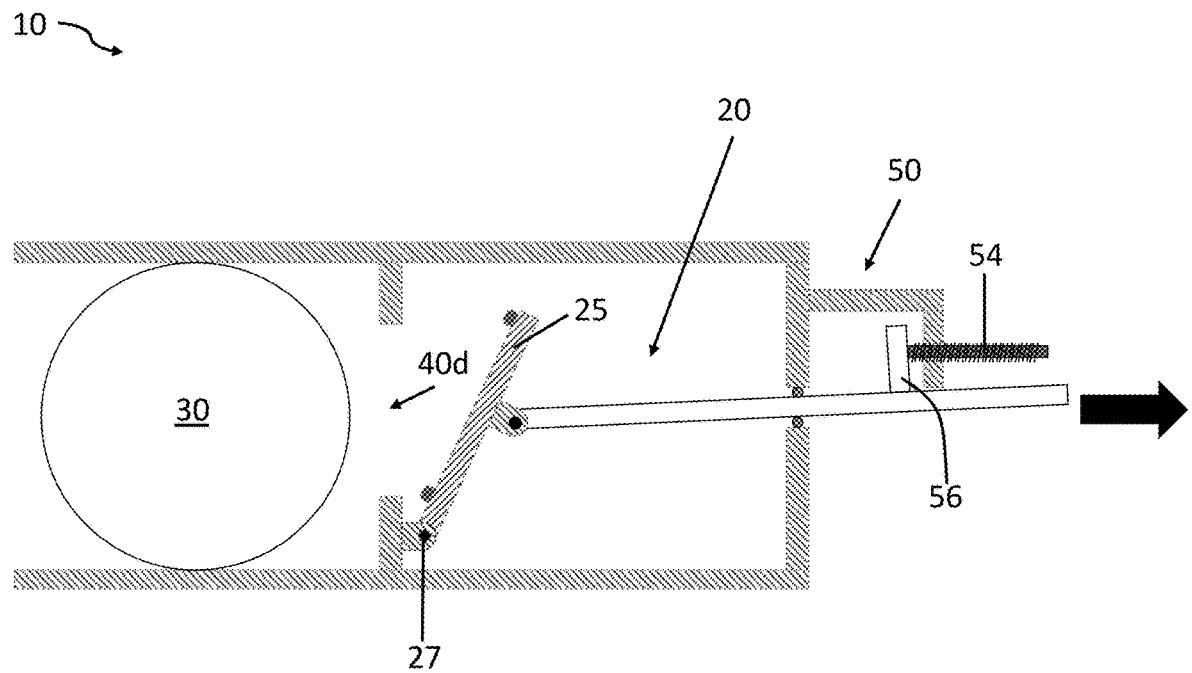
FIG. 9 is a schematic cross-sectional view of a fluid-based projectile launcher with a valve assembly in an open position with an increased area fluid passageway in accordance with disclosed embodiments.

FIG. 9 is a schematic cross-sectional view of a fluid-based projectile launcher 10 with a valve assembly 20 in an open position with an increased area fluid passageway 40*d* in accordance with disclosed embodiments. FIG. 9 is the same view with the same components as FIGS. 7-8, but FIG. 9 shows the projectile launcher 10 with the valve assembly 20 in another open state where the cross-sectional area of the fluid passageway 40*d* is increased relative to that shown in FIG. 8 passageway 40*c*.

Figure 10:
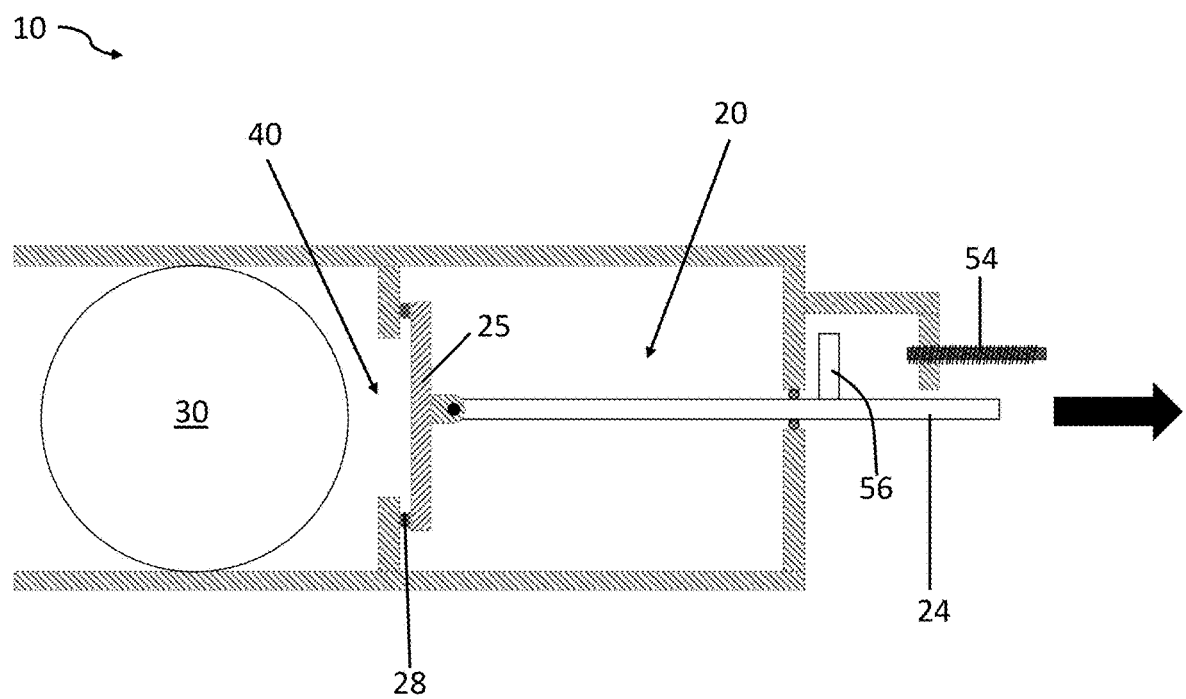
FIG. 10 is a schematic cross-sectional view of a fluid-based projectile launcher with a valve assembly in a closed position in accordance with disclosed embodiments.

FIG. 10 is a schematic cross-sectional view of a fluid-based projectile launcher 10 with a valve assembly 20 in a closed position in accordance with disclosed embodiments. As shown, another embodiment of valve assembly 20 may include a hatch 25 that does not pivot when sealing or unsealing the fluid passageway 40. A biasing device, such as a spring (not shown in FIG. 10), may be used to keep hatch 25 closed. Other configurations are also possible.

Figure 11:
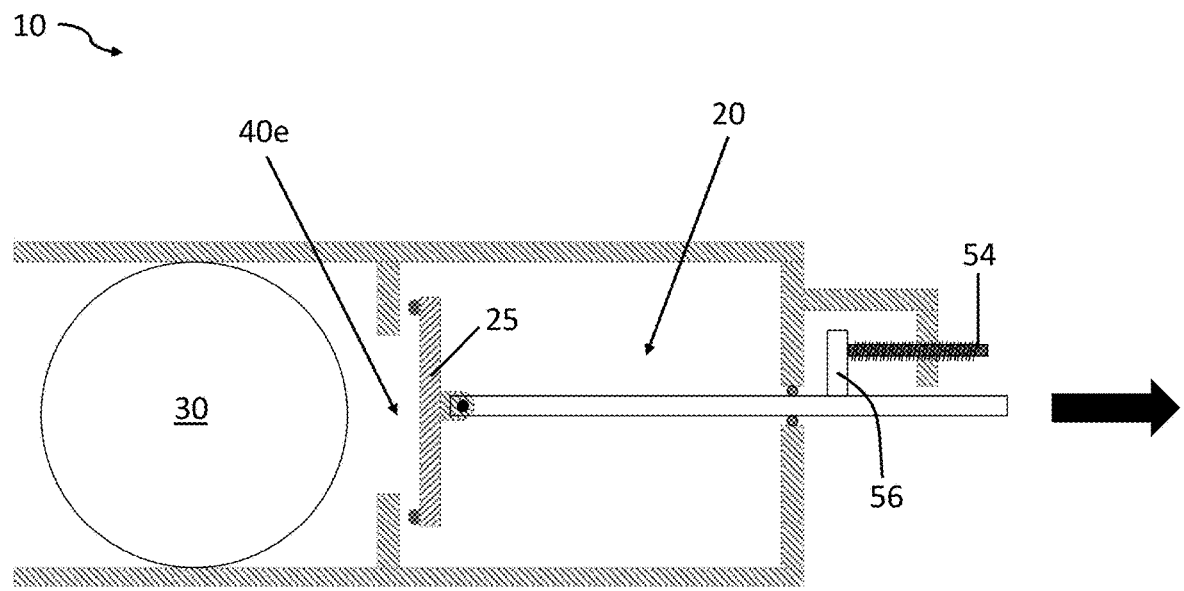
FIG. 11 is a schematic cross-sectional view of a fluid-based projectile launcher with a valve assembly in an open position with a reduced area fluid passageway in accordance with disclosed embodiments.

FIG. 11 is a schematic cross-sectional view of a fluid-based projectile launcher 10 with a valve assembly 20 in an open position with a reduced area fluid passageway 40*e* in accordance with disclosed embodiments. FIG. 11 is the same view with the same components as FIG. 10, but FIG. 11 shows the projectile launcher 10 with a valve assembly 20 in an open state, but in an open state where the cross-sectional area of the fluid passageway 40*e* is reduced relative to a fully open state.

Figure 12:
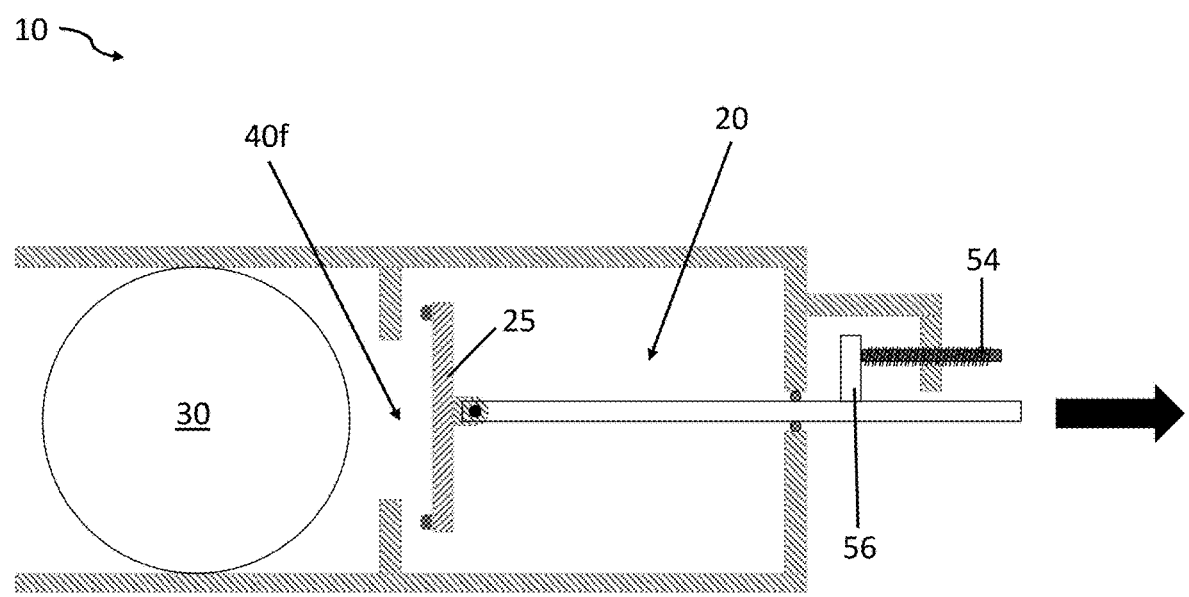
FIG. 12 is a schematic cross-sectional view of a fluid-based projectile launcher with a valve assembly in an open position with an increased area fluid passageway in accordance with disclosed embodiments.

FIG. 12 is a schematic cross-sectional view of a fluid-based projectile launcher 10 with a valve assembly 20 in an open position with an increased area fluid passageway 40*f* in accordance with disclosed embodiments. FIG. 12 is the same view with the same components as FIGS. 10-11, but FIG. 12 shows the projectile launcher 10 with the valve assembly 20 in an open state, but in an open state where the cross-sectional area of the fluid passageway 40*f* is increased relative to that shown in FIG. 11 for passageway 40*e*.

Figure 13:
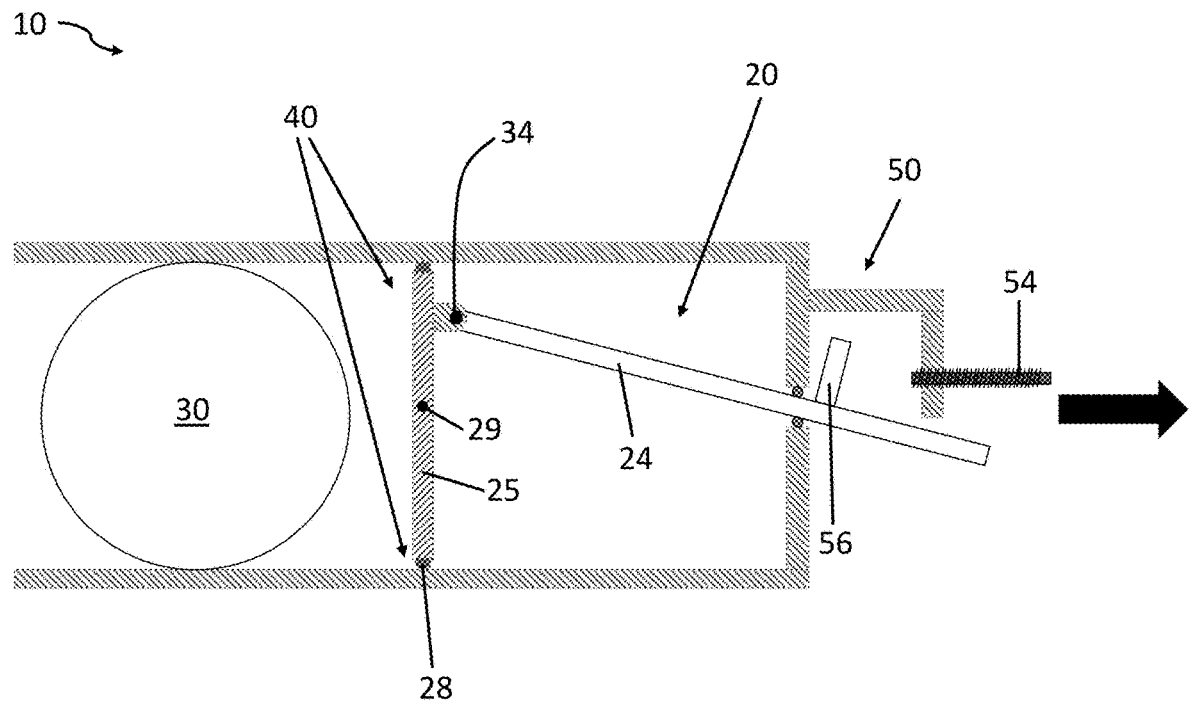
FIG. 13 is a schematic cross-sectional view of a fluid-based projectile launcher with a valve assembly in a closed position in accordance with disclosed embodiments.

FIG. 13 is a schematic cross-sectional view of a fluid-based projectile launcher 10 with a valve assembly 20 in a closed position in accordance with disclosed embodiments. As shown, another embodiment for valve assembly 20 and fluid passage 40 may also be used. In these embodiments, valve hatch 25 pivots about a central pivot point 29 by actuation of valve stem 24 connected through linkage 34. Other configurations are also possible. This, or similar, configuration creates fluid passageways 40 around the edges of hatch 25 as shown.

Figure 14:
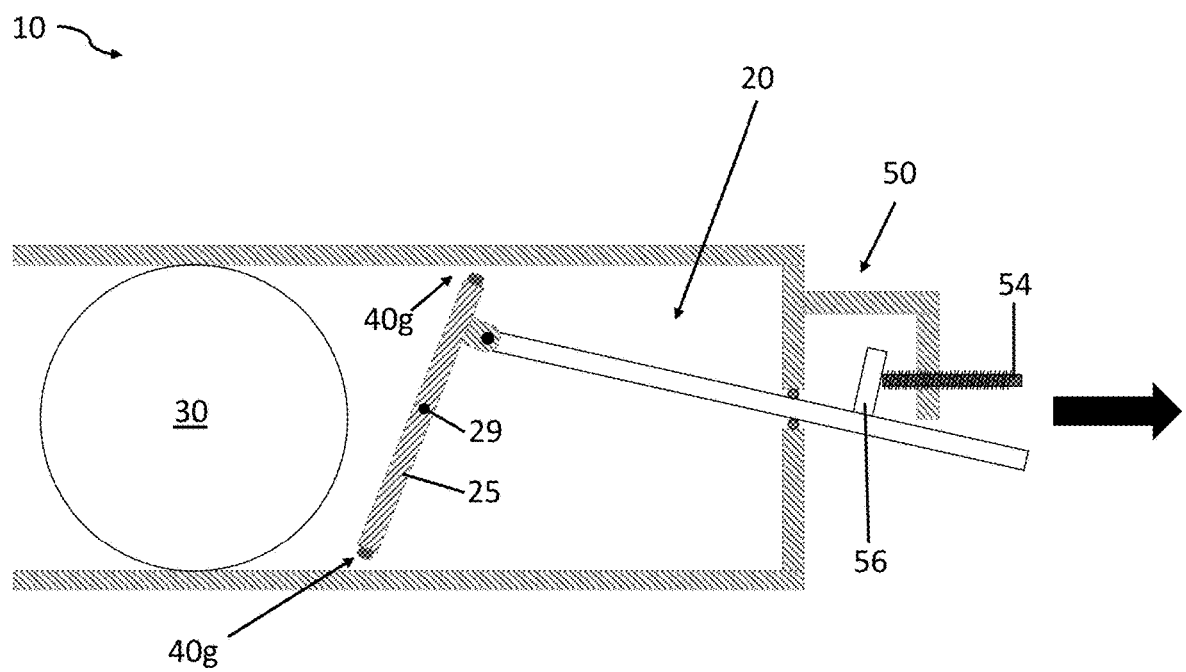
FIG. 14 is a schematic cross-sectional view of a fluid-based projectile launcher with a valve assembly in an open position with a reduced area fluid passageway in accordance with disclosed embodiments.

FIG. 14 is a schematic cross-sectional view of a fluid-based projectile launcher 10 with a valve assembly 20 in an open position with a reduced area fluid passageway 40*g* in accordance with disclosed embodiments. FIG. 14 is the same view with the same components as FIG. 13, but FIG. 14 shows the projectile launcher 10 with the valve assembly 20 in an open state, but in an open state where the cross-sectional area of the fluid passageway 40*g* is reduced relative to a fully open state.

Figure 15:
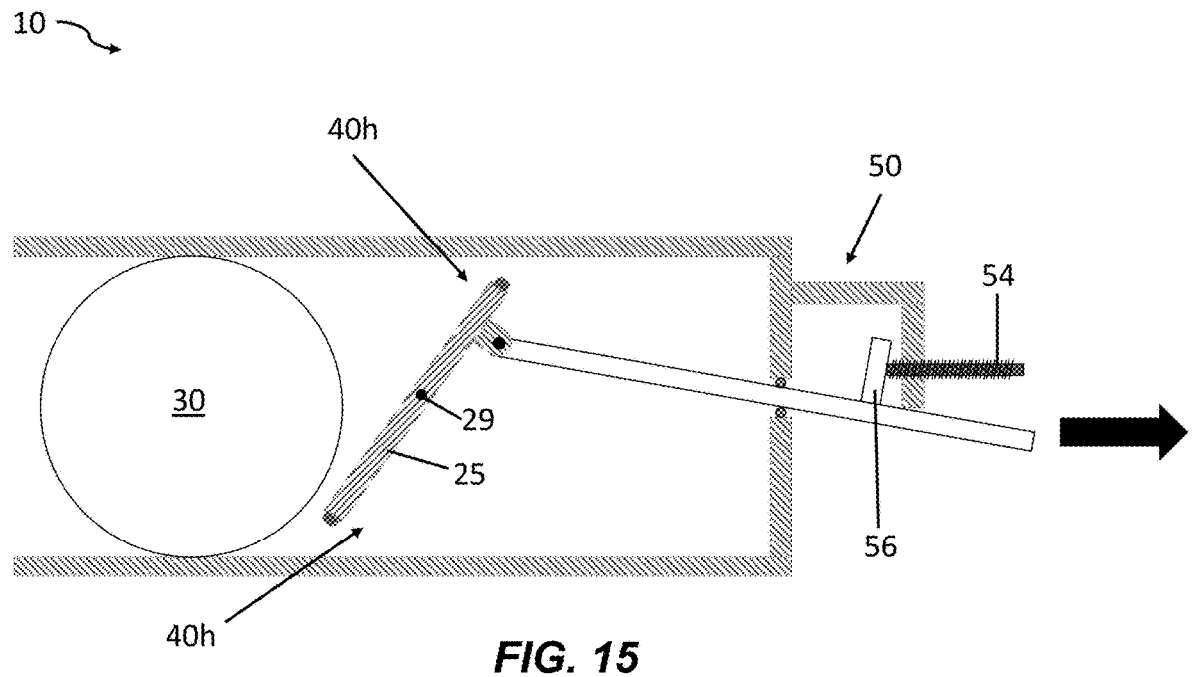
FIG. 15 is a schematic cross-sectional view of a fluid-based projectile launcher with a valve assembly in an open position with an increased area fluid passageway in accordance with disclosed embodiments.

FIG. 15 is a schematic cross-sectional view of a fluid-based projectile launcher 10 with a valve assembly 20 in an open position with an increased area fluid passageway 40*h* in accordance with disclosed embodiments. FIG. 15 is the same view with the same components as FIGS. 13-14, but FIG. 15 shows the projectile launcher 10 with valve assembly 20 in another open state where the cross-sectional area of the fluid passageway 40*h* is increased relative to the fluid passageway 40*g* shown in FIG. 14.

Figure 16:
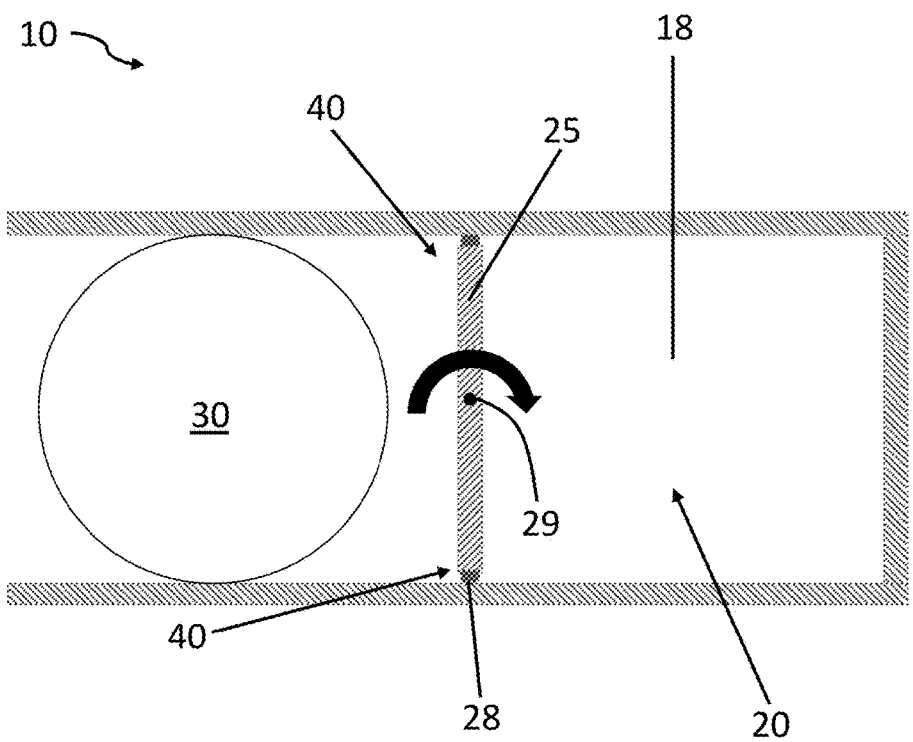
FIG. 16 is a schematic cross-sectional view of a fluid-based projectile launcher with a valve assembly in a closed position in accordance with disclosed embodiments.

FIG. 16 is a schematic cross-sectional view of a fluid-based projectile launcher 10 with a valve assembly 20 in a closed position in accordance with disclosed embodiments. As shown for these embodiments, valve assembly 20 is rotatable about central pivot 29 and creates fluid passageways 40 at the edges of valve hatch 25. Other configurations are also possible.

Figure 17:
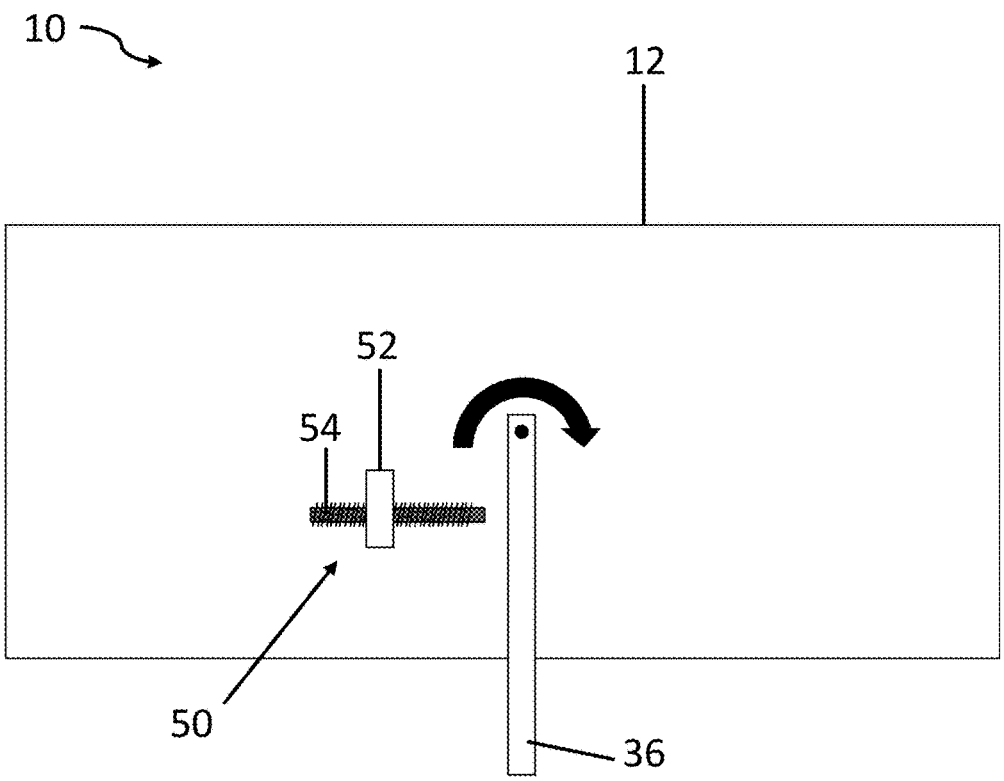
FIG. 17 is a schematic outer view of a fluid-based projectile launcher with a valve assembly in a closed position in accordance with disclosed embodiments.

FIG. 17 is a schematic outer view of a fluid-based projectile launcher 10 with a valve assembly 20 in a closed position in accordance with disclosed embodiments. FIG. 17 shows the outside of the launcher 10 shown in FIG. 16. As shown for these embodiments, adjustable block assembly 50 is mounted on the outer surface of housing 12 and provides an adjustable position stop for external lever arm or trigger 36 that rotates the internal valve hatch 25 about the pivot 29.

Figure 18:
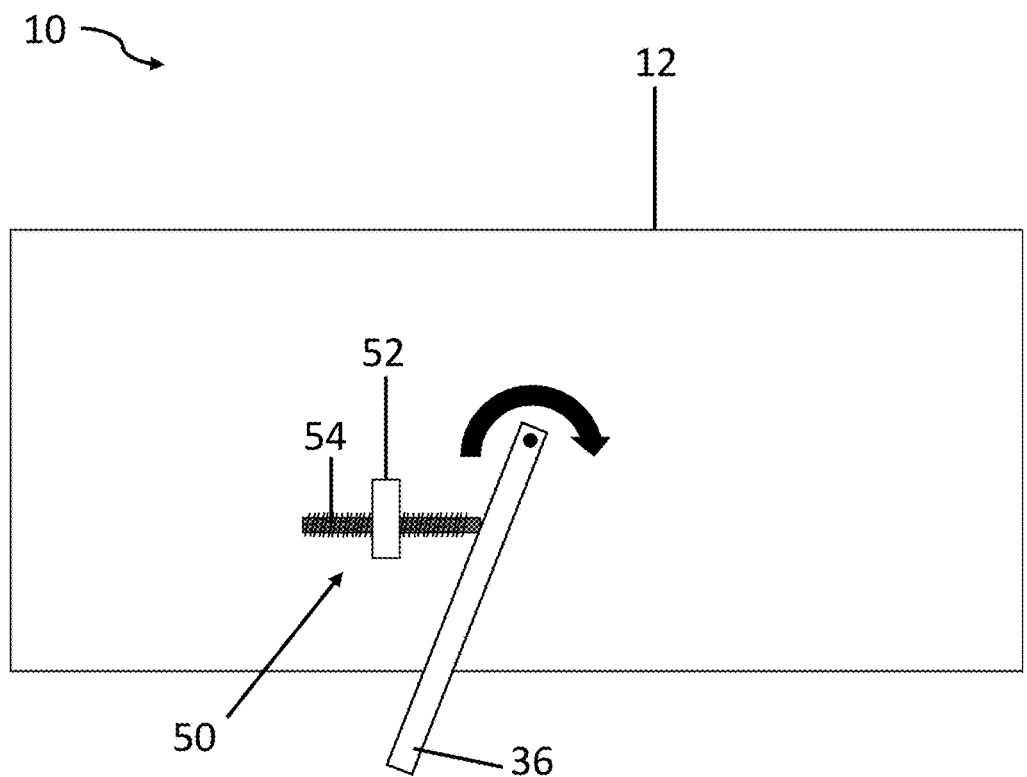
FIG. 18 is a schematic outer view of a fluid-based projectile launcher with a valve assembly in an open position with a decreased area fluid passageway in accordance with disclosed embodiments.

FIG. 18 is a schematic outer view of a fluid-based projectile launcher 10 with a valve assembly 20 in an open position with a decreased area fluid passageway 40$i$ (both best shown in FIG. 19) in accordance with disclosed embodiments. FIG. 18 shows the outside of the launcher 10 shown in FIG. 16. The adjustable block assembly 50 is in a position allowing the valve assembly 20 be partially open in some position that is defined or stopped by plug 54 contacting trigger 36.

Figure 19:
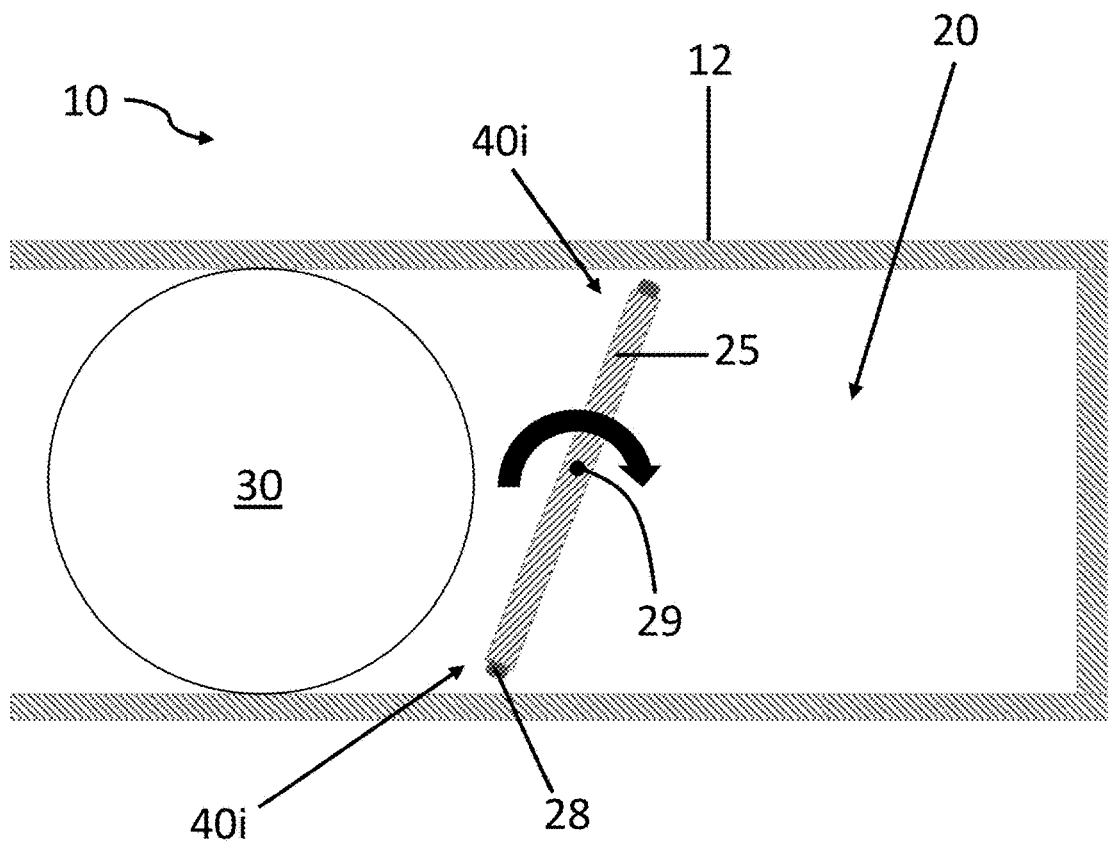
FIG. 19 is a schematic cross-sectional view of a fluid-based projectile launcher with a valve assembly in an open position with a decreased area fluid passageway in accordance with disclosed embodiments.

FIG. 19 is a schematic cross-sectional view of a fluid-based projectile launcher 10 with a valve assembly 20 in an open position with a decreased area fluid passageway 40$i$ in accordance with disclosed embodiments. FIG. 19 shows a cross-section of the of the launcher 10 shown in FIG. 18 with valve assembly 20 is a partially open position to create fluid passageways 40$i$.

Figure 20:
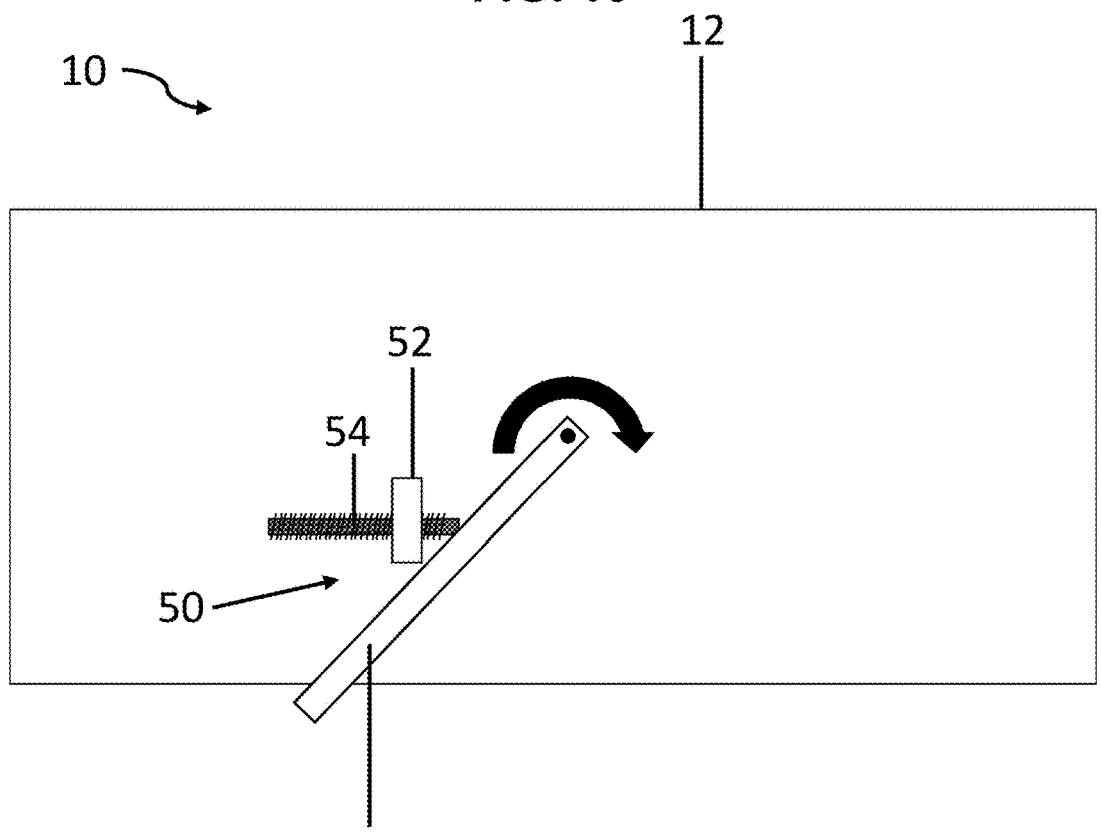
FIG. 20 is a schematic outer view of a fluid-based projectile launcher with a valve assembly in an open position with an increased area fluid passageway in accordance with disclosed embodiments.

FIG. 20 is a schematic outer view of a fluid-based projectile launcher 10 with a valve assembly 20 in an open position with an increased area fluid passageway 40$j$ (best shown in FIG. 21) in accordance with disclosed embodiments. FIG. 20 shows the outside of the launcher 10 shown in FIGS. 16-19. The adjustable block assembly 50 is in a position allowing the valve assembly 20 open in some other position to open a fluid passageway 40$j$ with a larger cross-sectional area than that shown for passageway 40$i$ in FIG. 19.

Figure 21:
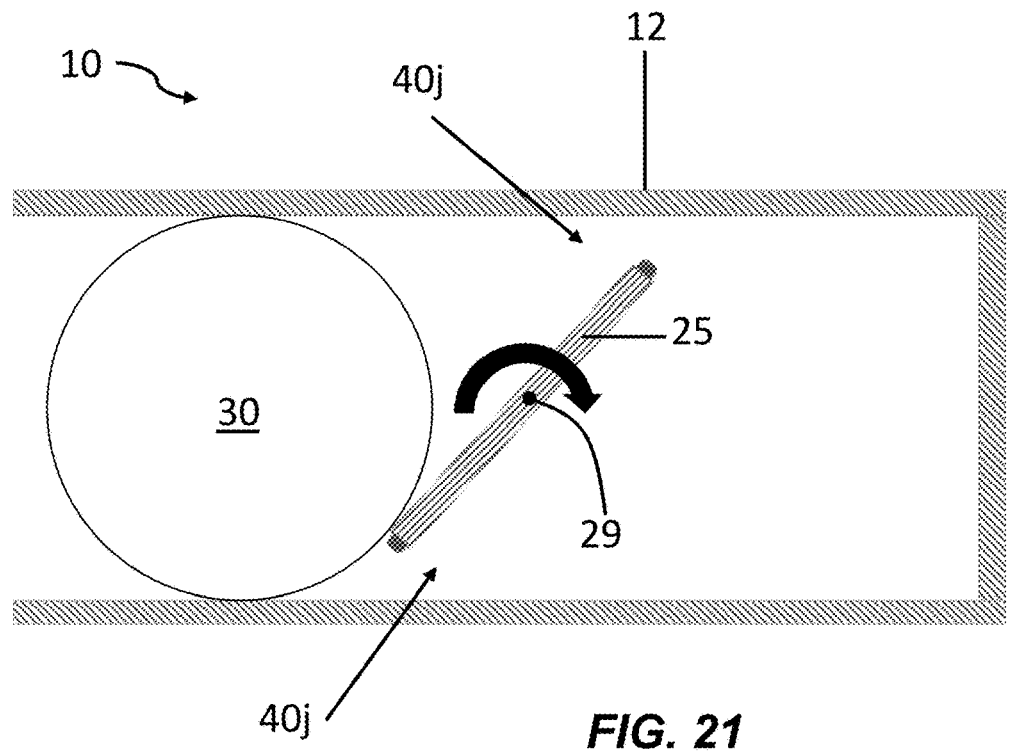
FIG. 21 is a schematic cross-sectional view of a fluid-based projectile launcher with a valve assembly in an open position with an increased area fluid passageway in accordance with disclosed embodiments.

FIG. 21 is a schematic cross-sectional view of a fluid-based projectile launcher 10 with a valve assembly 20 in an open position with an increased area fluid passageway 40$j$ (best shown in FIG. 21) in accordance with disclosed embodiments. FIG. 21 shows a cross-section of the of the launcher 10 shown in FIG. 20 showing the larger cross-sectional area of the fluid passageway 40$j$ as compared to the position of valve assembly 20 and fluid passageway 40$i$ shown in FIG. 19.

Figure 22:
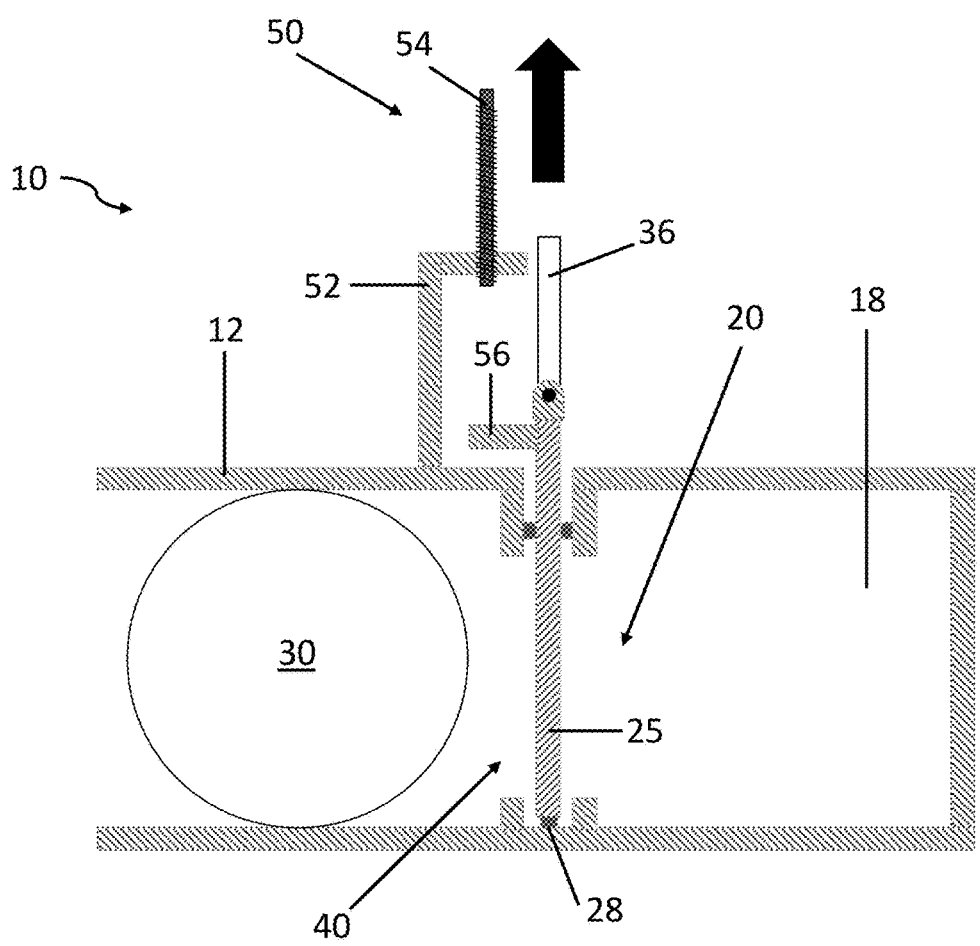
FIG. 22 is a schematic cross-sectional view of a fluid-based projectile launcher with a valve assembly in a closed position in accordance with disclosed embodiments.

FIG. 22 is a schematic cross-sectional view of a fluid-based projectile launcher 10 with a valve assembly 20 in a closed position in accordance with disclosed embodiments. As shown for these embodiments, valve assembly 20 may comprise a slidable door or hatch 25 to open a fluid passageway 40 from fluid chamber 18. As also shown, adjustable block assembly 50 and trigger 36 may be external to housing 12.

Figure 23:
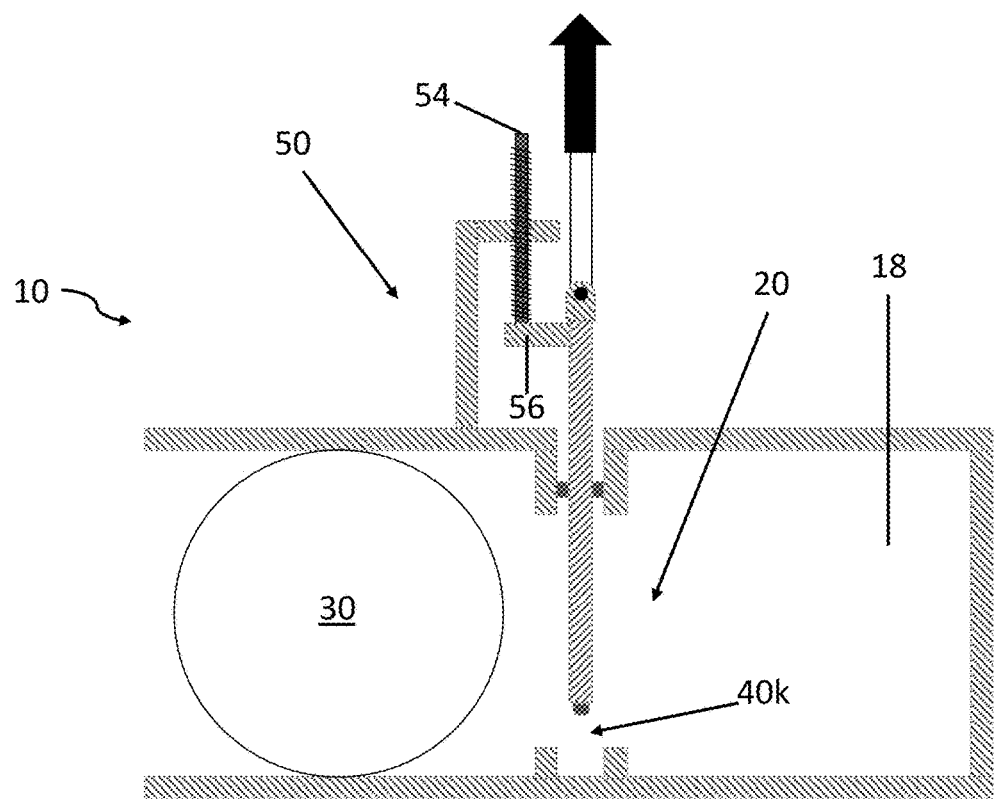
FIG. 23 is a schematic cross-sectional view of a fluid-based projectile launcher with a valve assembly in an open position with a decreased area fluid passageway in accordance with disclosed embodiments.

FIG. 23 is a schematic cross-sectional view of a fluid-based projectile launcher 10 of FIG. 22 with a valve assembly 20 in an open position with a decreased area fluid passageway 40$k$ in accordance with disclosed embodiments.

Figure 24:
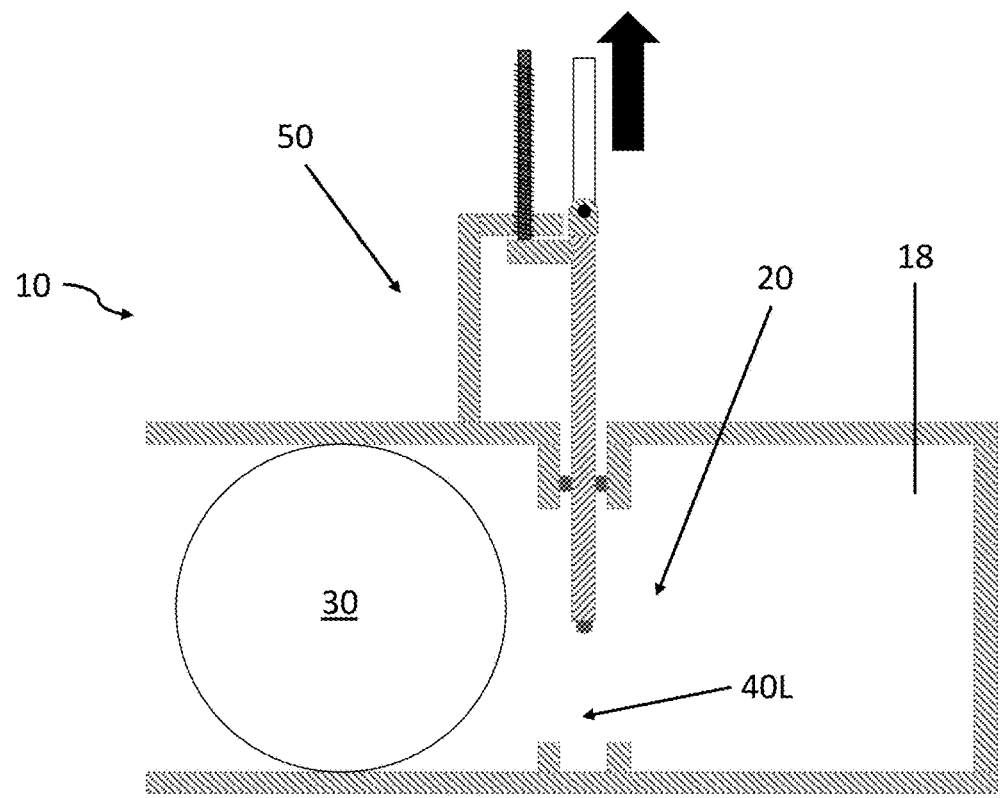
FIG. 24 is a schematic cross-sectional view of a fluid-based projectile launcher with a valve assembly in an open position with an increased area fluid passageway in accordance with disclosed embodiments.

FIG. 24 is a schematic cross-sectional view of a fluid-based projectile launcher 10 with a valve assembly 20 in an open position with an increased area fluid passageway 40$l$ in accordance with disclosed embodiments. FIG. 24 is the same view with the same components as FIGS. 22-23, but FIG. 24 shows the projectile launcher 10 in an with the valve assembly 20 in an open state where the cross-sectional area of the fluid passageway 40$l$ is increased relative to the open state show in FIG. 23 for fluid passageway 40$k$.

Figure 25:
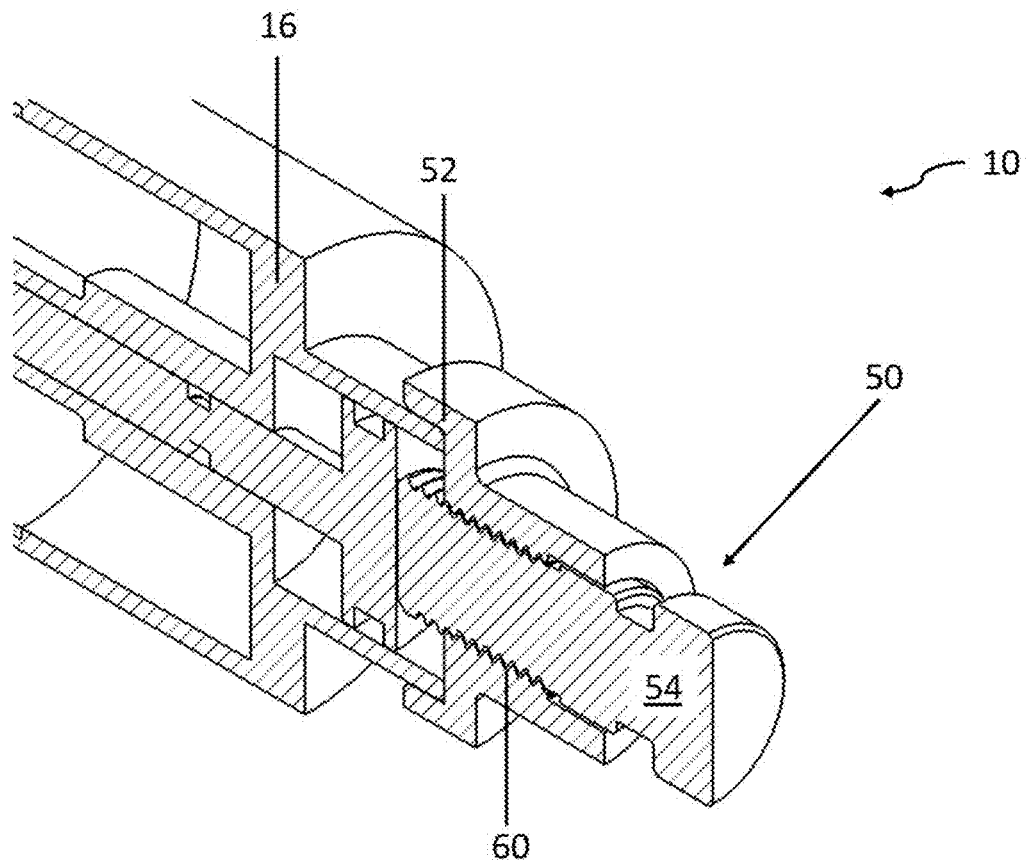
FIG. 25 is a partial cross-sectional view of a fluid-based projectile launcher with an adjustable blocking plug in accordance with disclosed embodiments.

FIG. 25 is a partial cross-sectional view of a fluid-based projectile launcher 10 with an adjustable block assembly 50 in accordance with disclosed embodiments. As shown, embodiments of adjustable block assembly 50 may comprise a retaining portion 52 and a plug 54 to selectively control the position to which valve assembly 20 will travel. As shown for the embodiments in FIG. 25, plug 54 and retaining portion 52 may have threading 60 to allow plug 54 to be turned to a desired stop position.

Figure 26:
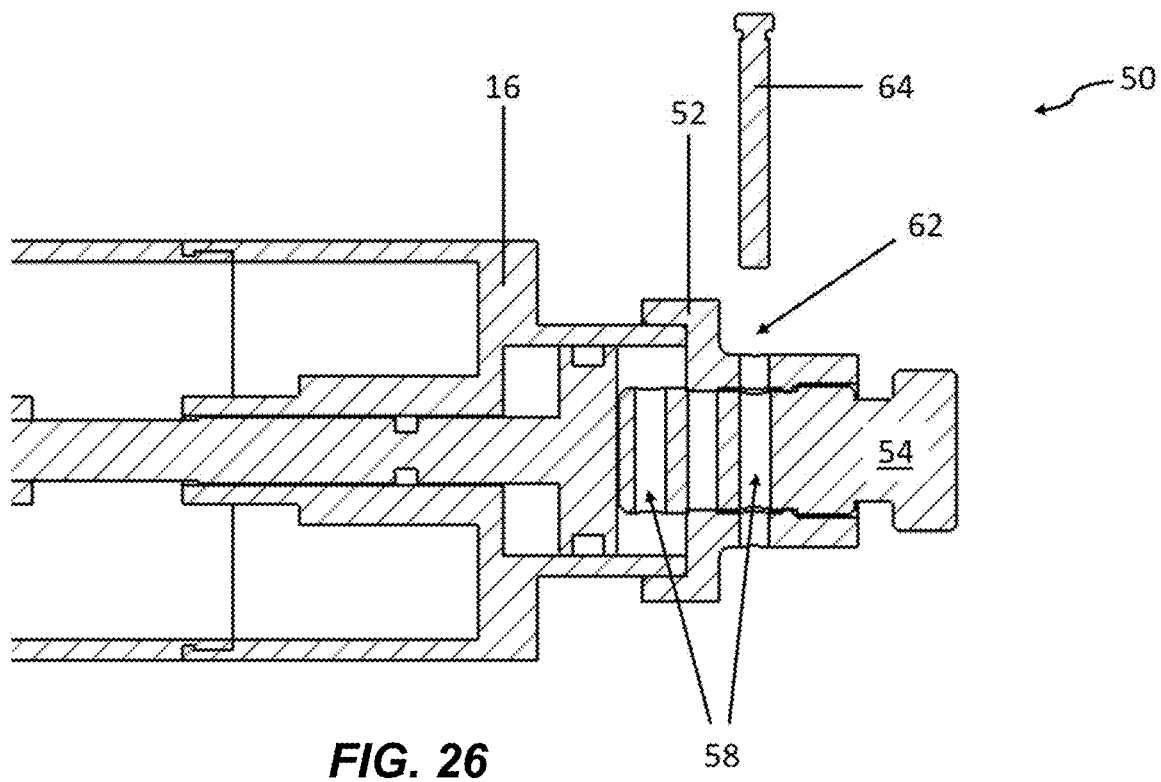
FIG. 26 is a partial cross-sectional view of a fluid-based projectile launcher with an adjustable blocking plug in accordance with disclosed embodiments.

FIG. 26 is a partial cross-sectional view of a fluid-based projectile launcher 10 with an adjustable block assembly 50 in accordance with disclosed embodiments. As shown for these embodiments, blocking assembly 50 may comprise a plug 54 with holes 58 that line up with one or more holes 62 in the retaining portion 52 and enable selective positioning of the plug 54 by placement of a pin 64 or the like.

Figure 27:
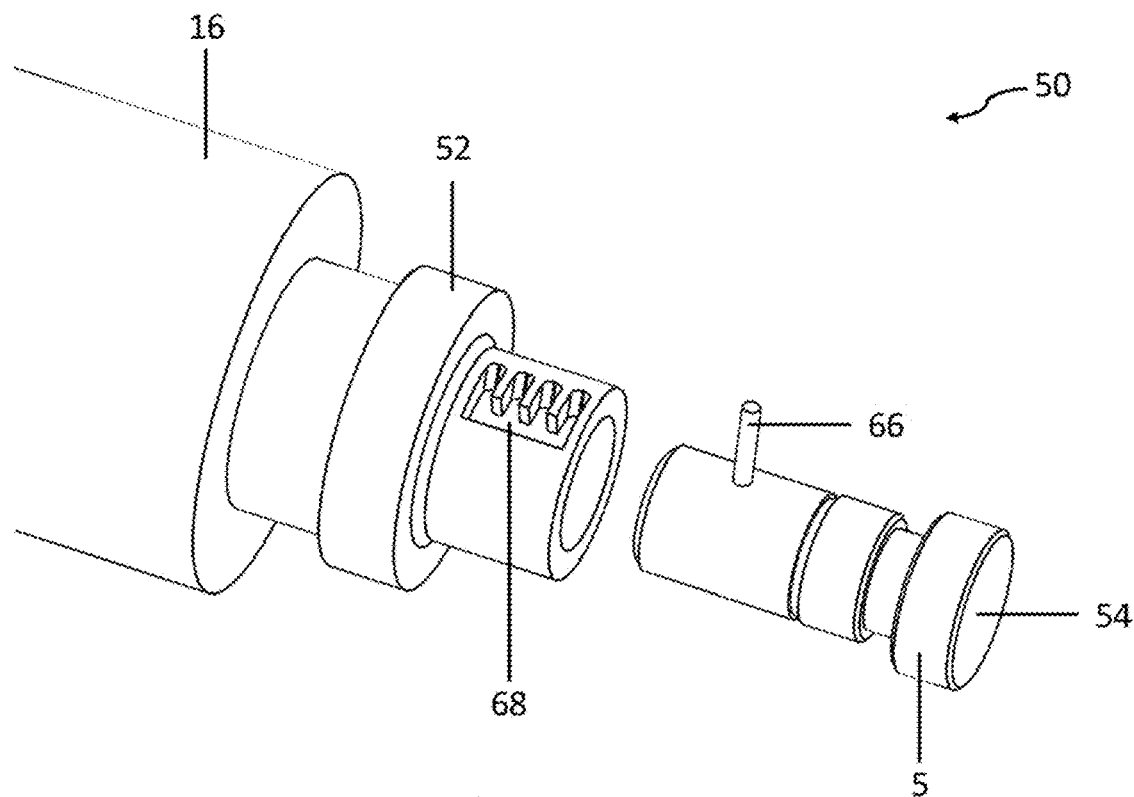
FIG. 27 is an exploded partial isometric view of a fluid-based projectile launcher with an adjustable blocking plug in accordance with disclosed embodiments.

FIG. 27 is an exploded partial isometric view of a fluid-based projectile launcher 10 with an adjustable block assembly 50 in accordance with disclosed embodiments. As shown for these embodiments, blocking assembly 50 may comprise a plug 54 with a projection or pin 66 that engages with one or more grooves 68 in the retaining portion 52 and enable selective positioning of the plug 54 by movement of the pin 66 within the grooves 68.

Figure 28:
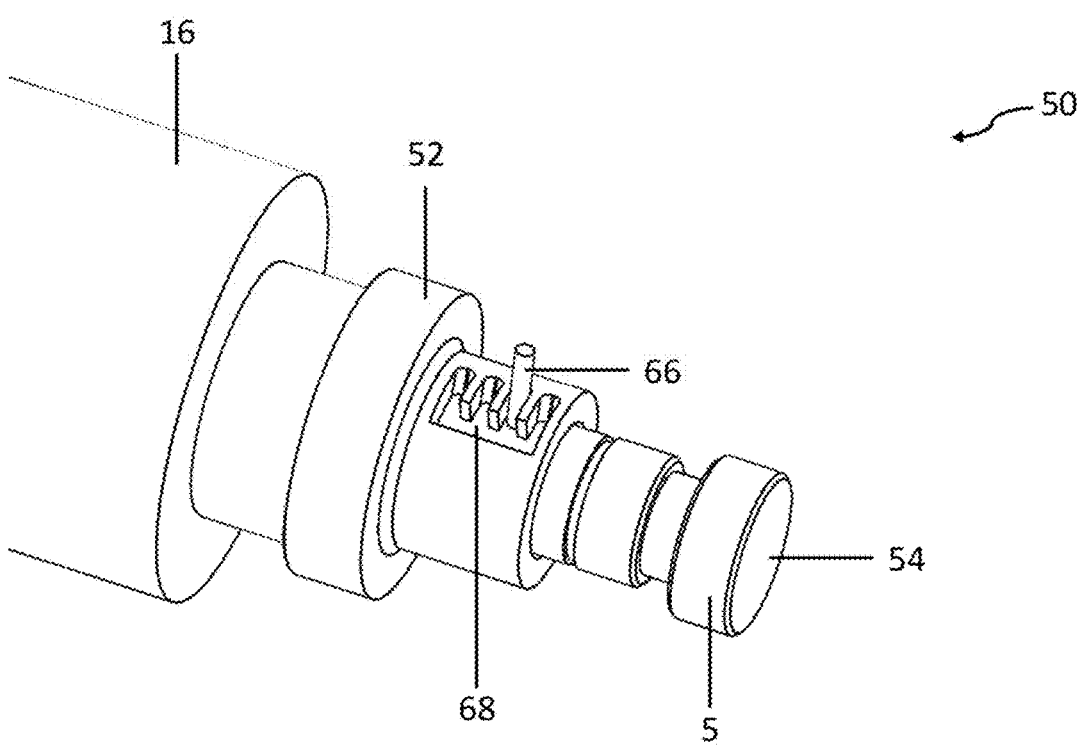
FIG. 28 is a partial isometric view of a fluid-based projectile launcher with an adjustable blocking plug in accordance with disclosed embodiments.
Figure 29A:
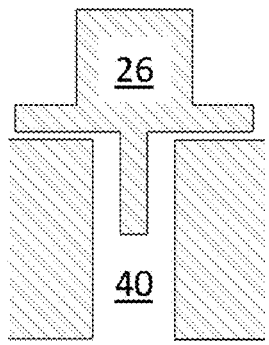
FIGS. 29A-G are schematic representations of valve stoppers in accordance with disclosed embodiments.
Figure 29B:
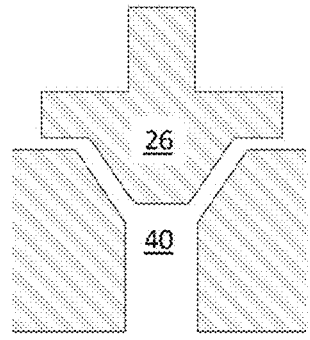
Figure 29C:
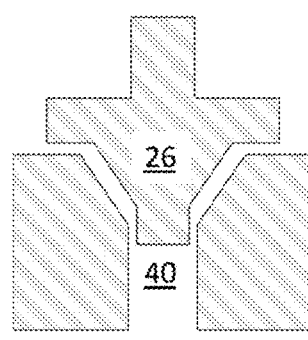
Figure 29D:
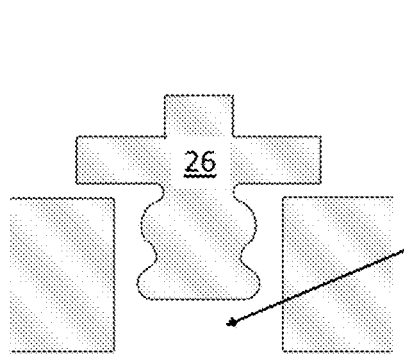
Figure 29E:
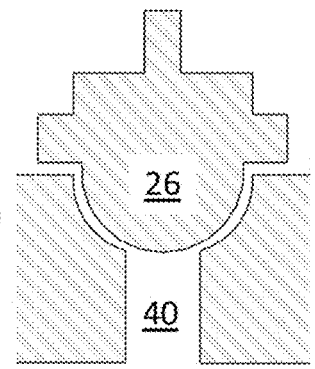
Figure 29F:
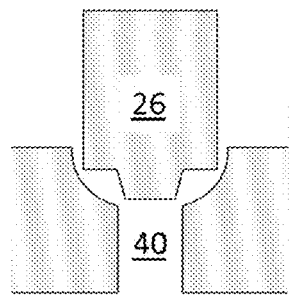
Figure 29G:
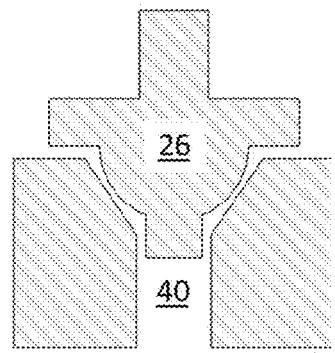

FIG. 28 is a partial isometric view of the fluid-based projectile launcher 10 of FIG. 27 showing an assembled view of the adjustable block assembly 50. As one of ordinary skill in the art having the benefit of this disclosure would understand, other configurations, arrangements, components, and the like of adjustable block assembly 50 are also possible.

FIGS. 29A-G are schematic representations of valve stoppers 26 in accordance with disclosed embodiments. As would be apparent to one of ordinary skill in the art having the benefit of this disclosure, any suitable shape stopper 26 may be used to selectively seal, partially seal (i.e., change the cross-sectional area), or unseal the fluid passageway 40, and may be made of any suitable material (e.g., rubber, cork, metal, plastics, etc.).

As will be apparent to those of ordinary skill in the art, disclosed embodiments relate to a projectile launching system 10, utilizing fluid to propel or "launch" a projectile 30. Disclosed embodiments are capable of holding or containing fluid in a pressure vessel or container (e.g., fluid chamber 18), or are capable of being connected to a fluid source, or are capable of interacting with energized fluid (fluid may be energized by pumps, fans, chemical reactions, explosions, combustion, and so forth). The fluid is introduced in some manner to this system 10 such that it imparts or applies a force, either directly or indirectly on the projectile 30, causing it to move.

Propellant fluid may not necessarily be stored in a closed fluid chamber 18. The fluid power source may be provided from a holding tank, pump, fan, chemical reactions, or other method of providing fluid at sufficient energy to move the projectile 30.

Disclosed methods and apparatuses allow the launch speed of a fluid propelled projectile 30 to vary even if the propellant fluids are stored and released under identical conditions, such as, for example, fluids released at the same initial pressure from a container holding the propellant fluid with a fixed volume. Disclosed embodiments also allow for projectiles 30 of different mass and/or aerodynamic properties to be propelled at the same initial speeds using propellant fluids stored and released under similar conditions.

The variation of launch speeds does not require adjustment to the propellent fluid source. The adjustment may also be made in conjunction with changes to the propellant fluid source, such as to compensate for changes in pressure, or to allow for a larger overall range of launch speeds.

Disclosed systems can be constructed of common materials using well established techniques such as machining or molding. Metals, such as aluminum or steel, or composites or plastics are also suitable. Seals can be made using generally accepted sealing practices such as o-rings or valve seats.

As disclosed herein, the launcher 10 may contain a mechanism such as an adjustable valve assembly 20 that is utilized to release the propellant fluid. A fluid passageway 40 is provided through which the propellant fluid passes through before encountering the projectile 30 (either directly or indirectly).

The launcher 10 contains an adjustable valve assembly 20 and an adjustable block assembly 50 that cooperate to change the size of the valve assembly 20 opening, and/or that changes the cross-sectional area of fluid passageway 40. The adjustable block assembly may interact (either directly or indirectly) with the valve assembly 20.

In general, a smaller fluid flow opening, or smaller cross-sectional area, generally restricts the fluid flow, typically resulting in the projectile 30 being propelled at a lower speed. A larger opening, or larger cross-sectional area, typically results in the projectile 30 being propelled at a higher speed. The adjustable block assembly 50 controls the position of valve assembly 20 components making up the fluid flow passageway 40, making the cross-sectional area larger or smaller. As one of ordinary skill in the art having the benefit of this disclosure would comprehend, the flow of propellant fluid is controlled, metered, or otherwise regulated as disclosed herein. Utilizing this method allows for rapid adjustment to launch speed without necessitating adjustment to the propellant fluid source (for example, propellant amount, pressure, container size, energy state, or energy incitement and so forth). Although if desired, the conditions which impact the propellant fluid as a projectile 30 is launching could be adjusted as well.

Disclosed embodiments also include a fluid passageway 40, and a valve assembly 20 that has a geometrical relationship with the fluid flow passageway 40 such that more flow or less flow is allowed through the passageway 40 depending on the position of the valve assembly 20. These different flow levels affect the launch speed of the projectile 30.

Examples of flow restrictors are a tapered passageway (e.g., FIG. 1, passageway 40) with a non-tapered valve stopper (e.g. FIG. 1, stopper 26) passing through it, a tapered stopper (e.g., FIG. 4, stopper 26b) in a non-tapered passageway (e.g., FIG. 4, passageway 40b), or a tapered stopper in a tapered passageway. Other examples are different cross-sectional area changes which are non-tapered (e.g., FIGS. 7-24).

As also disclosed herein, the position of the valve assembly 20 can be controlled by various components. Disclosed embodiments include an adjustable block assembly 50 that controls the amount of travel of the valve assembly 20, and, therefore, the position of the valve when opened, and therefore the amount of flow restriction of the propellant.

As also disclosed herein, embodiments also include to a variety of plugs 54 to adjust the working, or open position, of the valve assembly 20, or other restrictions or opening size for fluid flow passageway 40. As will be apparent to those of ordinary skill in the art having the benefit of this disclosure, adjustable block assembly 50 can be a simple mechanical plug or stop (e.g., plug 54 or stop 56) which controls the position of the valve assembly 20, or the size of the fluid passageway 40 opening, or fluid passageway 40 cross-sectional area by stopping or restricting motion. Various examples are shown in FIGS. 1-28.

As also disclosed herein, the adjustable block assembly 50 may include a threaded member (e.g., plug 54, FIGS. 7-15, 17-18, 20, and 22-25) which is turned to control the relative position of this component, a hole and pin arrangement (e.g., holes 58, 62 and pin 64, FIG. 26) in which the position is controlled by pins and holes, pins and slots (e.g., pin 66 and slots 68, FIGS. 27-28), and so forth. Other arrangements will be apparent to those of ordinary skill in the art having the benefit of this disclosure.

As also disclosed herein, embodiments include a fluid passageway 40. The fluid passageway 40 has a shape, or features, which can create a cross-sectional area that can be varied in the direction of fluid flow, or that can interact with other features such that the cross-sectional area can vary in the direction of the fluid flow.

As also disclosed herein, embodiments include an adjustable valve assembly 20. Various portions of the valve assembly 20 (e.g., stoppers 26, 26b, hatch 25, and the like) may be inserted into the fluid passageway 40. In the closed position (e.g., FIG. 1), a seal is made between the valve stopper 26 and fluid passageway 40. As disclosed herein, various ways can be implemented to translate motion the valve assembly 20, or to change the position of the valve assembly 20 relative to any reference point of the fluid passageway 40. This could be done in many ways, such as with a pneumatic or hydraulic cylinder, manual movement, a spring-loaded movement with a release mechanism, etc. In some disclosed embodiments (e.g., FIGS. 1-6), the valve assembly 20 moves via pneumatic power. The seal between the valve assembly 20 and the fluid passageway 40 is broken as the valve assembly 20 moves to areas of larger cross-sectional area. This allows the propellant fluid to flow from the fluid chamber 18, or other fluid source, to contact the projectile 30.

As also disclosed herein, the cross-sectional area of the fluid passageway 40 may increase as the valve assembly 20 translates. A linear tapered cross section is shown in FIG. 1, FIG. 2 and FIG. 3. Other embodiments may use different cross-sectional profiles to achieve the desired results (for example non-linear tapering, or changing diameters with no tapering, etc.). Or the valve assembly 20 may include a shape which results in differing cross-sectional areas for the fluid flow path as the position of the valve changes (for example, FIG. 4, FIG. 5 and FIG. 6). Typically, the larger cross-sectional areas provide less flow resistance than smaller ones. Restricted fluid flow from the fluid chamber 18, or other fluid source, results in lower launch speeds of the projectile 30.

In some embodiments, the further the valve assembly 20 travels, the less restriction to the fluid flow. This results in launch speed of the projectile 30 increasing as the valve assembly 20 travels further.

Disclosed embodiments also include an adjustable block assembly 50. The distance that the valve assembly 20 can travel may be controlled by an adjustable block assembly 50. Because the block assembly 50 controls the travel of the valve assembly 20, and, therefore, the fluid flow resistance, the launch speed of the projectile 30 is also controlled by adjusting the position of the block assembly 50. In some embodiments, the block assembly and its adjustment mechanism are a single component (e.g., FIGS. 1-6 and 25). However, in other embodiments, the adjustment device or mechanism and the blocking member may be separate components, or there may be multiple components connected functionally in such a way that the adjustment mechanism causes the position of any components which changes the cross-sectional area of the fluid path to change (e.g., FIGS. 7-24 and 26-28).

In some embodiments, adjustment of the block assembly 50 is done prior to moving the valve assembly 20. But the adjustment could also be done as the valve assembly 20 is moving.

In some embodiments, the adjustable block mechanism 50 contains threads (e.g., threading 60, FIG. 25) which mates with corresponding threads, or threadlike features on the device, which allow for the block assembly 50 position to be changed by rotation. FIG. 25 shows an internal view of how these threads 60 or thread-like features would interact. Threads 60 may be partial or full, with multiple paths or single paths, or thread-like features such as "bayonet" style mechanisms.

In other embodiments, an adjustment feature is constructed which controls the block assembly 50 with a pin or pins 64. An example is shown in FIG. 26. The adjustment could also be accomplished by a groove or slot or series of slots or grooves (e.g. grooves 68, FIG. 27-28) which interact with a feature such as a pin 66 in the example shown in FIGS. 27-28. The construction and existence of an adjustable block assembly 50 may be accomplished by other methods such as a cam lock system, or gear or system of gears, rack and pinion system, hydraulic or pneumatic pressure, urging members, and so on. A myriad of techniques exist for holding and adjusting the position of a body and a fully exhaustive list cannot be provided here as would be apparent to persons of ordinary skill having the benefit of this disclosure.

In some embodiments the components that move to release the propellent fluid also acts as a variable flow restrictor. Various examples are shown in FIGS. 1-24. However, disclosed embodiments also include flow restrictors placed in the path of the propellent. It is generally desirable to have the mechanism which releases the fluid propellent be the same as the mechanism which restricts or controls the flow due to reduction of parts. However, there could be a separate mechanism in addition to the adjustable flow path mechanism and features, which releases the fluid propellent to allow it to interact (either directly or indirectly) with the projectile 30. The drawings and descriptions in this application of the adjustable cross-sectional area systems also apply to systems where the fluid propellent is released by separate mechanisms, which may be independent of the cross-sectional area adjustments.

Although various embodiments have been shown and described, the present disclosure is not so limited and will be understood to include all such modifications and variations would be apparent to one skilled in the art.

What is claimed is:

1. A valve assembly for a fluid-based projectile launcher comprising:
    a housing comprising a propellant fluid chamber;
    a valve assembly that selectively meters the flow of propellant fluid from the propellant fluid chamber to a fluid passageway, the valve assembly comprising:
        a valve stem comprising a valve head at a first end and located outside the propellant fluid chamber; and
        a valve stopper at a second end opposite to the first end and that seals the fluid passageway when closed; and
        an adjustable block assembly that contacts at least a portion of the valve head to limit the motion of the valve assembly.

2. The fluid-based projectile launcher of claim 1 wherein the fluid passageway is tapered and the valve stopper is substantially not tapered.

3. The fluid-based projectile launcher of claim 1 further comprising a barrel that attaches to the housing.

4. The fluid-based projectile launcher of claim 1 wherein the adjustable block assembly further comprises an adjustable position plug that contacts at least a portion of the valve assembly to prevent further motion of the valve assembly.

5. The fluid-based projectile launcher of claim 4 wherein the adjustable position plug has threading.

6. The fluid-based projectile launcher of claim 4 wherein the adjustable block assembly further comprises a stop that contacts the adjustable position plug to prevent further motion of the valve assembly.

7. The fluid-based projectile launcher of claim 1 wherein the valve assembly further comprises:
    a valve hatch and wherein the valve hatch substantially seals the fluid passageway in a closed position.

8. The fluid-based projectile launcher of claim 7 wherein the valve hatch pivots to change the cross-sectional area of the fluid passageway.

9. The fluid-based projectile launcher of claim 8 wherein the valve hatch pivots about a central pivot to change the cross-sectional area of the fluid passageway.

10. The fluid-based projectile launcher of claim 7 wherein the valve hatch moves in a substantially linear direction to change the cross-sectional area of the fluid passageway.

11. The fluid-based projectile launcher of claim 1 wherein propellant fluid is stored in the propellant fluid chamber prior to release into the fluid passageway.

12. The fluid-based projectile launcher of claim 1 wherein propellant fluid is introduced into the propellant fluid chamber from another source prior to release into the fluid passageway.

13. A method of making a valve assembly for a fluid-based projectile launcher, the method comprising:
    providing a housing comprising a propellant fluid chamber;
    providing a valve assembly that selectively meters the flow of propellant fluid from the propellant fluid chamber through a fluid passageway, the valve assembly comprising:
        a valve stem comprising a valve head at a first end and located outside the propellant fluid chamber; and
        a valve stopper at a second end opposite to the first end and that seals the fluid passageway when closed; and
    providing an adjustable block assembly that contacts at least a portion of the valve head to limit the controls motion of the valve assembly.

14. The method of claim 13 wherein the step of providing a valve assembly further comprises:
    providing a valve hatch and wherein the valve hatch substantially seals the fluid passageway in a closed position.

15. The method of claim 13 wherein the step of providing an adjustable block assembly further comprises providing an adjustable position plug that contacts at least a portion of the valve assembly to prevent further motion of the valve assembly.

16. A valve assembly for projectile launcher system comprising:
    a housing comprising a propellant fluid chamber;
    a valve assembly that selectively changes a cross-sectional area of a fluid passageway to change the flow of propellant fluid from the propellant fluid chamber through the fluid passageway, the valve assembly comprising:
        a valve stem comprising a valve head at a first end and located outside the propellant fluid chamber; and
        a valve stopper at a second end opposite to the first end and that seals the fluid passageway when closed; and an adjustable block assembly that controls the position of the valve assembly.

17. The projectile launcher system of claim 16 wherein the valve assembly further comprises:
a valve hatch and wherein the valve hatch substantially seals the fluid passageway in a closed position.

* * * * *